United States Patent
Haka et al.

(10) Patent No.: US 10,006,529 B2
(45) Date of Patent: Jun. 26, 2018

(54) OFF-HIGHWAY CONTINUOUSLY VARIABLE PLANETARY-BASED MULTIMODE TRANSMISSION INCLUDING INFINITE VARIABLE TRANSMISSION AND DIRECT CONTINUOUSLY VARIABLE TRANSMISSION

(71) Applicant: DANA LIMITED, Maumee, OH (US)

(72) Inventors: Raymond J. Haka, Brighton, MI (US); Matthias W. J. Byltiauw, Hooglede (BE)

(73) Assignee: Dana Limited, Maumee, OH (US)

( * ) Notice: Subject to any disclaimer, the term of this patent is extended or adjusted under 35 U.S.C. 154(b) by 35 days.

(21) Appl. No.: 15/319,004

(22) PCT Filed: Jun. 17, 2015

(86) PCT No.: PCT/US2015/036170
§ 371 (c)(1),
(2) Date: Dec. 15, 2016

(87) PCT Pub. No.: WO2015/195759
PCT Pub. Date: Dec. 23, 2015

(65) Prior Publication Data
US 2017/0130811 A1    May 11, 2017

Related U.S. Application Data

(60) Provisional application No. 62/087,545, filed on Dec. 4, 2014, provisional application No. 62/013,129, filed on Jun. 17, 2014.

(51) Int. Cl.
*F16H 37/08* (2006.01)
*F16H 15/50* (2006.01)
*F16H 3/66* (2006.01)

(52) U.S. Cl.
CPC ............ *F16H 37/086* (2013.01); *F16H 3/66* (2013.01); *F16H 15/503* (2013.01); *F16H 2037/0886* (2013.01)

(58) Field of Classification Search
None
See application file for complete search history.

(56) References Cited

U.S. PATENT DOCUMENTS 2,019,006 A    10/1935   Ferrarl
2,060,884 A    11/1936   Madle
(Continued)

FOREIGN PATENT DOCUMENTS

CN    101479503 B    7/2009
EP    1174645 A3    1/2002
(Continued)

OTHER PUBLICATIONS

International Search Report and Written Opinion for Application No. PCT/US2015/036170, dated Dec. 17, 2015, issued by the USPTO.
European Search Report dated Feb. 5, 2018 (7 pages).

*Primary Examiner* — Justin Holmes
(74) *Attorney, Agent, or Firm* — Marshall & Melhorn, LLC

(57) ABSTRACT

A variable transmission includes various powerpath layouts comprising configurations based on a two stage gearbox with a first stage providing a multi-mode configuration combining power-split modes, direct drive modes and a directional stage to select driving either forward or reverse with a pair of direction clutches; or multi-mode operation comprising a planetary gear set as the central part of the configurations together with the CVP, wherein the modes are selected by engaging a clutch/brake while releasing the others. These configurations are particularly useful for compact Off-Highway applications such as compact wheel load- (Continued)

ers having a wide speed range and high rimpull force requirement where an operator may also desire limited jerking motion during shifts in the low speed range.

19 Claims, 19 Drawing Sheets

(56) References Cited

U.S. PATENT DOCUMENTS

| | | |
|---|---|---|
| 2,148,759 A | 2/1939 | Grand |
| 2,660,897 A | 12/1953 | Neidhart et al. |
| 2,729,118 A | 1/1956 | Emslie |
| 2,931,235 A | 4/1960 | Hayward |
| 3,203,278 A | 8/1965 | General |
| 3,407,687 A | 10/1968 | Hayashi |
| 3,894,559 A | 7/1975 | Depuy |
| 4,333,358 A | 6/1982 | Grattapaglia |
| 4,344,336 A | 8/1982 | Carriere |
| 4,464,952 A | 8/1984 | Stubbs |
| 4,754,664 A | 7/1988 | Dick |
| 4,756,211 A | 7/1988 | Fellows |
| 4,856,371 A | 8/1989 | Kemper |
| 5,230,670 A | 7/1993 | Hibi |
| 5,318,486 A | 6/1994 | Lutz |
| 5,577,423 A | 11/1996 | Mimura |
| 5,776,028 A | 7/1998 | Matsuda |
| 5,961,415 A | 10/1999 | Justice |
| 5,996,226 A | 12/1999 | Gibbs |
| 6,036,616 A | 3/2000 | McCarrick |
| 6,059,685 A | 5/2000 | Hoge |
| 6,099,431 A * | 8/2000 | Hoge .................... F16H 37/086 475/214 |
| 6,558,285 B1 | 5/2003 | Sieber |
| 6,641,497 B2 | 11/2003 | Deschamps |
| 6,689,012 B2 | 2/2004 | Miller |
| 6,705,964 B2 | 3/2004 | Nagai |
| 6,726,590 B2 | 4/2004 | Henzler |
| 6,979,275 B2 | 12/2005 | Hiraku |
| 6,986,725 B2 | 1/2006 | Morscheck |
| 7,074,154 B2 | 7/2006 | Miller |
| 7,104,917 B2 | 9/2006 | Klemen |
| 7,160,220 B2 | 1/2007 | Shinojima |
| 7,217,214 B2 | 5/2007 | Morscheck |
| 7,234,543 B2 | 6/2007 | Schaaf |
| 7,288,044 B2 | 10/2007 | Gumpoltsberger |
| 7,431,677 B2 | 10/2008 | Miller |
| 7,470,210 B2 | 12/2008 | Miller |
| 7,473,202 B2 | 1/2009 | Morscheck |
| 7,588,514 B2 | 9/2009 | McKenzie |
| 7,686,729 B2 | 3/2010 | Miller |
| 7,727,107 B2 | 6/2010 | Miller |
| 7,980,972 B1 | 7/2011 | Starkey |
| 8,029,401 B2 | 10/2011 | Johnson |
| 8,066,614 B2 | 11/2011 | Miller |
| 8,257,217 B2 | 9/2012 | Hoffman |
| 8,287,414 B2 | 10/2012 | Weber |
| 8,313,404 B2 | 11/2012 | Carter |
| 8,376,903 B2 | 2/2013 | Pohl |
| 8,382,636 B2 | 2/2013 | Shiina |
| 8,469,856 B2 | 6/2013 | Thomassy |
| 8,888,643 B2 | 11/2014 | Lohr |
| 8,926,468 B2 | 1/2015 | Versteyhe |
| 8,986,150 B2 | 3/2015 | Versteyhe |
| 9,052,000 B2 | 6/2015 | Cooper |
| 9,228,650 B2 | 1/2016 | Schoolcraft |
| 9,353,842 B2 | 5/2016 | Versteyhe |
| 9,416,858 B2 | 8/2016 | Versteyhe |
| 9,551,404 B2 | 1/2017 | Ziech |
| 2002/0004438 A1 | 1/2002 | Toukura |
| 2002/0094911 A1 | 7/2002 | Haka |
| 2003/0181280 A1 | 9/2003 | Elser |
| 2003/0228952 A1 | 12/2003 | Joe |
| 2004/0171452 A1 | 9/2004 | Miller |
| 2005/0137046 A1 | 6/2005 | Miller |
| 2005/0153810 A1 | 7/2005 | Miller |
| 2005/0164831 A1 * | 7/2005 | Wafzig .................. F16H 37/086 477/198 |
| 2006/0234822 A1 * | 10/2006 | Morscheck ......... F16H 37/0833 475/211 |
| 2008/0039273 A1 | 2/2008 | Smithson |
| 2009/0017959 A1 | 1/2009 | Triller |
| 2009/0132135 A1 | 5/2009 | Quinn |
| 2009/0221391 A1 | 9/2009 | Bazyn |
| 2009/0286651 A1 | 11/2009 | Tanaka |
| 2009/0312137 A1 | 12/2009 | Rohs |
| 2010/0093479 A1 | 4/2010 | Carter |
| 2010/0137094 A1 | 6/2010 | Pohl |
| 2010/0267510 A1 | 10/2010 | Nichols |
| 2010/0282020 A1 | 11/2010 | Greenwood |
| 2011/0034284 A1 | 2/2011 | Pohl |
| 2011/0152031 A1 | 6/2011 | Schoolcraft |
| 2011/0165982 A1 | 7/2011 | Hoffman |
| 2011/0165985 A1 | 7/2011 | Hoffman |
| 2011/0165986 A1 | 7/2011 | Hoffman |
| 2011/0230297 A1 | 9/2011 | Shiina |
| 2011/0319222 A1 | 12/2011 | Ogawa |
| 2012/0035016 A1 | 2/2012 | Miller |
| 2012/0040794 A1 | 2/2012 | Schoolcraft |
| 2012/0244990 A1 | 9/2012 | Ogawa |
| 2012/0309579 A1 | 12/2012 | Miller |
| 2013/0130859 A1 | 5/2013 | Lundberg et al. |
| 2013/0184115 A1 | 7/2013 | Urabe |
| 2013/0226416 A1 | 8/2013 | Seipold |
| 2013/0303325 A1 | 11/2013 | Carey |
| 2014/0274540 A1 | 9/2014 | Schoolcraft |
| 2014/0329637 A1 | 11/2014 | Thomassy |
| 2015/0024899 A1 | 1/2015 | Phillips |
| 2015/0051801 A1 | 2/2015 | Quinn |
| 2015/0204429 A1 | 7/2015 | Versteyhe |
| 2015/0226294 A1 | 8/2015 | Ziech |
| 2015/0226298 A1 | 8/2015 | Versteyhe |
| 2015/0252881 A1 | 9/2015 | Versteyhe |
| 2015/0354676 A1 | 12/2015 | Versteyhe |
| 2016/0033021 A1 | 2/2016 | Cooper |
| 2016/0047448 A1 | 2/2016 | Versteyhe |
| 2016/0109001 A1 | 4/2016 | Schoolcraft |
| 2016/0131235 A1 | 5/2016 | Phillips |
| 2017/0089433 A1 | 3/2017 | Stevenson |
| 2017/0089434 A1 | 3/2017 | Waltz |

FOREIGN PATENT DOCUMENTS

| | | |
|---|---|---|
| FR | 1030702 A | 6/1953 |
| GB | 2248895 A | 4/1992 |
| WO | 1997032145 | 8/1996 |
| WO | 2007051827 A1 | 5/2007 |
| WO | 2012135936 | 10/2012 |
| WO | 2012177187 A1 | 12/2012 |
| WO | 2014039438 A2 | 3/2014 |
| WO | 2014039439 A1 | 3/2014 |
| WO | 2014039447 | 3/2014 |
| WO | 2014039448 A2 | 3/2014 |
| WO | 2014078583 A1 | 5/2014 |
| WO | 2014159755 A3 | 10/2014 |
| WO | 2014165259 A1 | 10/2014 |
| WO | 2014179717 A1 | 11/2014 |
| WO | 2014179719 A1 | 11/2014 |
| WO | 2014186732 A1 | 11/2014 |
| WO | 2015073948 A2 | 5/2015 |
| WO | 2015195759 A3 | 12/2015 |
| WO | 2015200769 A1 | 12/2015 |
| WO | 2016094254 A1 | 6/2016 |
| WO | 2016186439 A1 | 10/2016 |
| WO | 2016178913 A1 | 11/2016 |
| WO | 2016182838 A1 | 11/2016 |
| WO | 2016205639 A1 | 12/2016 |
| WO | 2017027404 A8 | 2/2017 |

* cited by examiner

Continuously Variable Planetary $r_i > r_o$ Underdrive | $r_i = r_o$ 1:1 | $r_i < r_o$ Overdrive Speed Ratio (Shifting Mechanism)

Basic driveline configuration

3*2 Mode – Wide: Modes Provided by the First Stage of the Gearbox

3*2 Mode - Wide

3*2 Mode – Short: Modes Provided by the First Stage of the Gearbox

3*2 Mode - Short

2*2 Mode: Modes Provided by the First Stage of the Gearbox

2*2 Mode: Planetary Speed Diagram

2*2 Mode

Forward DD mode (locked planetary)

Reverse DD mode (grounded planetary)

IVT mode (powersplit)

Configuration for Multi-Mode Operation

Configuration 2 – Layout

Configuration 3 – Layout

OFF-HIGHWAY CONTINUOUSLY VARIABLE PLANETARY-BASED MULTIMODE TRANSMISSION INCLUDING INFINITE VARIABLE TRANSMISSION AND DIRECT CONTINUOUSLY VARIABLE TRANSMISSION

CROSS-REFERENCE

This application claims the benefit of U.S. Provisional Application No. 62/013,129, filed Jun. 17, 2014 and U.S. Provisional Application No. 62/087,545, filed Dec. 4, 2014, which application is incorporated herein by reference.

BACKGROUND OF THE INVENTION

Automatic and manual transmissions are commonly used in the automotive market. Those transmissions become more and more complicated to improve fuel economy and minimize exhaust emissions. This finer control of the engine speed in conventional transmissions can typically be done by developing more advanced control algorithms or adding extra gears but with increased overall complexity and cost. In addition to these, Variable Transmissions have been proposed for Off-Highway (OH) applications such as compact wheel loaders.

SUMMARY OF THE INVENTION

In some configurations, a variable transmission includes various powerpath layouts comprising three configurations based on a two stage gearbox. The first stage provides a multi-mode configuration combining power-split modes; Infinite Variable Transmission (IVT), with the geared neutral functionality, Overdrive (OD) and direct drive modes. The second stage is the directional stage to select driving either forward or reverse with a pair of direction clutches. The main difference between the three configurations concerns the first stage and especially the number of modes or their components. These configurations are particularly useful for compact Off-Highway applications such as compact wheel loaders having a wide speed range and high rimpull force requirement where an operator may also desire limited jerking motion during shifts in the low speed range.

In other configurations, a variable transmission includes various powerpath layouts comprising three configurations based on multi-mode operation. These configurations are based on a three mode solution, each mode being selected by engaging a clutch/brake while releasing the others. A planetary gear set is the central part of the configurations together with a Continuously Variable Planetary (CVP) variator. The number of layouts can be extended with different mode combinations by changing the way the planetary gear is used. The planetary gear can be used as a summing differential, joining the input speeds and torques at two of its elements into an output speed and torque at its third element. It can also be used as a simple gear ratio, either by locking any two elements together or by grounding one element of choice. Moreover, using a compound planetary instead of a simple planetary provides more flexibility in optimizing gear ratios, and thus improved efficiency, with the cost of additional complexity. These configurations are particularly useful for compact Off-Highway applications such as compact wheel loaders having a wide speed range and high rimpull force requirement where an operator may also desire limited jerking motion during shifts in the low speed range.

An important objective is to provide smooth and unnoticeable shifts between a certain reverse speed and a certain forward speed. Outside this area, non-synchronous shifts are acceptable. The layouts presented below consist of various operating modes, comprising direct drive and powersplit modes. All layouts comprise an IVT mode, allowing a powered neutral feature. In all the modes, the CVP device is run at a relatively high rotational speed and thus corresponding relatively low torque, with the principle objective of reducing the CVP size.

Provided herein is a variable transmission based on a three mode gearbox with directional stage comprising: an input shaft; a variator (CVP) comprising an input ring assembly drivingly engaged to the input shaft, and an output ring assembly; a dual planetary gear set comprising; a direct (DIR) drive clutch, a first planetary gearset comprising the elements: a first sun gear, a first set of planet gears, a first carrier, and a first ring gear, and a second planetary gearset comprising the elements: a second sun gear, a second set of planet gears, a second carrier and a second ring gear, wherein the variator (CVP) is connected to the first sun, and wherein the variator (CVP) may also be connected to an optional first gear ratio; an infinitely variable transmission (IVT) clutch and an overdrive (OD) clutch linked to the input shaft between a power source (ICE) and the variator; wherein the ICE is connected through the output of the OD clutch to the second carrier through a second gear ratio; and wherein the output of the IVT clutch is connected to the second ring through a third gear ratio which is linked to the first carrier; the first sun gear and the second sun gear are connected to form a dual sun gear set; the first ring gear (output) is drivingly engaged to a first part of a forward (FWD) clutch and to a reverse idler shaft (REV-IS) wherein, the reverse idler shaft (REV-IS) is connected to an output of the variable transmission through a reverse (REV) clutch.

In some embodiments of the variable transmission the optional first gear ratio is connected to the transmission before the variator (CVP), or between the variator (CVP) and the first sun gear, or not included in the transmission.

In some embodiments, the variable transmission comprises three modes of operation comprising: a power recirculation (IVT) mode; a direct drive mode; and a powersplit (OD) mode.

In some embodiments of the variable transmission, the power recirculation (IVT) mode allows a seamless ratio shift from a negative ratio to a powered neutral ratio and positive ratios.

In some embodiments of the variable transmission, the power from the power source is split between a high efficiency mechanical path and the CVP variator path.

In some embodiments of the variable transmission, the power-recirculation is present in order to provide speed ratios close to or equal to zero.

In some embodiments of the variable transmission, the direct drive mode comprises: the direct (DIR) drive clutch configured to lock any two elements of the first planetary gearset to each other. In some embodiments of the variable transmission, the any two elements are arbitrarily chosen depending on physical constraints placed on the transmission.

In some embodiments of the variable transmission, the powersplit (OD) mode provides high speeds and increases the spread of the transmission. In some embodiments of the variable transmission, the power from the power source is split between a high efficiency mechanical path and the CVP variator path.

In some embodiments of the variable transmission, the REV clutch provides negative speeds, and synchronization during braking and directional shifts. In some embodiments of the variable transmission, the FWD clutch provides positive speeds, and synchronization during braking and directional shifts.

In some embodiments of the variable transmission, the variator (CVP) is always connected directly to the power source (ICE) and to the dual sun gear set.

In some embodiments of the variable transmission, when operating in the power recirculation (IVT) mode, the second ring gear is connected to the ICE through a gear ratio and turns at a constant speed.

In some embodiments of the variable transmission, when operating in the direct drive mode, the dual planetary gearset is locked in a 1:1 ratio and all power flows through the CVP.

In some embodiments of the variable transmission, when operating in the powersplit (OD) mode, the second carrier is connected to the ICE through a gear ratio and turns at a constant speed.

In some embodiments of the variable transmission, the three mode gearbox consists of the variator (CVP) and a dual planetary gearset.

In some embodiments of the variable transmission, during normal operation within one mode, only one of the IVT or OD or DIR clutch and one of the FWD or REV clutches is active or closed at one time.

In some embodiments of the variable transmission, both the IVT and OD clutch or both of the IVT and DIR clutch or both of the DIR and OD clutch, and both of the FWD and REV clutches can be active during transitions between modes or during braking.

Provided herein is a variable transmission based on a three mode gearbox with directional stage comprising: an input shaft; a variator (CVP) comprising an input ring assembly drivingly engaged to the input shaft, and an output ring assembly; a single planetary gear set comprising; a direct (DIR) drive clutch, and the planetary gear set elements: a sun gear, a set of planet gears, a carrier, and a ring gear; wherein the variator (CVP) is connected to the first sun, and wherein the variator (CVP) may also be connected to an optional first gear ratio; an infinitely variable transmission (IVT) clutch and an overdrive (OD) clutch linked to the input shaft between a power source (ICE) and the variator; wherein the ICE is connected through the output of the OD clutch to the carrier through a second gear ratio; and wherein the output of the IVT clutch is connected to the carrier through a third gear ratio; the (output) ring gear is drivingly engaged to a first part of a forward (FWD) clutch and to a reverse idler shaft (REV-IS) wherein, the reverse idler shaft (REV-IS) is connected to an output of the variable transmission through a reverse (REV) clutch.

In some embodiments of the variable transmission, the optional first gear ratio is connected to the transmission before the variator (CVP), or between the variator (CVP) and the first sun gear, or not included in the transmission.

In some embodiments, the variable transmission comprises three modes of operation comprising: a power recirculation (IVT) mode; a direct drive (DIR) mode; and a powersplit (OD) mode.

In some embodiments of the variable transmission, the power recirculation (IVT) mode allows a seamless ratio shift from a negative ratio to a powered neutral ratio and positive ratios.

In some embodiments of the variable transmission, the power from the power source is split between a high efficiency mechanical path and the CVP variator path.

In some embodiments of the variable transmission, the power-recirculation will be present in order to provide speed ratios close to or equal to zero.

In some embodiments of the variable transmission, the direct drive mode comprises: the direct (DIR) drive clutch configured to lock any two elements of the planetary gearset to each other.

In some embodiments of the variable transmission, the any two elements are arbitrarily chosen depending on physical constraints placed on the transmission.

In some embodiments of the variable transmission, the powersplit (OD) mode provides high speeds and increases the spread of the transmission.

In some embodiments of the variable transmission, the power from the power source is split between a high efficiency mechanical path and the CVP variator path.

In some embodiments of the variable transmission, the REV clutch provides negative speeds, and synchronization during braking and directional shifts. In some embodiments of the variable transmission, the FWD clutch provides positive speeds, and synchronization during braking and directional shifts.

In some embodiments of the variable transmission, the variator (CVP) is always connected directly to the power source (ICE) and to the sun gear.

In some embodiments of the variable transmission, when operating in the power recirculation (IVT) mode, the carrier is connected to the ICE through the third gear ratio and turns at a constant speed.

In some embodiments of the variable transmission, when operating in the direct drive mode, the dual planetary gearset is locked in a 1:1 ratio and all power flows through the CVP.

In some embodiments of the variable transmission, when operating in the powersplit (OD) mode, the carrier turns at the speed of the power source (ICE) times the second gear ratio (OD ratio).

In some embodiments of the variable transmission, the three mode gearbox consists of the variator (CVP) and a single planetary gearset.

In some embodiments of the variable transmission, during normal operation within one mode, only one of the IVT or OD or DIR clutch and one of the FWD or REV clutches is active or closed at one time. In some embodiments of the variable transmission, both of the IVT and OD clutch or both of the IVT and DIR clutch or both of the DIR and OD clutch, and both of the FWD and REV clutches can be active during transitions between modes or during braking.

Provided herein is a variable transmission based on a two mode gearbox with directional stage comprising: an input shaft; a variator (CVP) comprising an input ring assembly drivingly engaged to the input shaft, and an output ring assembly; a single planetary gear set comprising: a direct (DIR) drive clutch and the planetary gear set elements: a sun gear, a set of planet gears, a carrier, and a ring gear, wherein the variator (CVP) is connected to the sun, and wherein the variator (CVP) may also be connected to an optional first gear ratio; an infinitely variable transmission (IVT) clutch linked to the input shaft between a power source (ICE) and the variator; wherein the ICE is connected through the output of the IVT clutch to the carrier through a second gear ratio; the (output) ring gear is drivingly engaged to a first part of a forward (FWD) clutch and to a reverse idler shaft (REV-IS) wherein, the reverse idler shaft (REV-IS) is connected to an output of the variable transmission through a reverse (REV) clutch.

In some embodiments of the variable transmission, the optional first gear ratio is connected to the transmission before the variator (CVP), or between the variator (CVP) and the first sun gear, or not included in the transmission.

In some embodiments, the variable transmission comprises two modes of operation comprising: a power recirculation (IVT) mode; and a direct drive (DIR) mode.

In some embodiments of the variable transmission, the power recirculation (IVT) mode allows a seamless ratio shift between the IVT mode and the direct drive mode. In some embodiments of the variable transmission, the power from the power source is split between a high efficiency mechanical path and the CVP variator path. In some embodiments of the variable transmission, the power-recirculation will be present in order to provide speed ratios close to or equal to zero.

In some embodiments of the variable transmission, the direct drive mode comprises: the direct (DIR) drive clutch configured to lock any two elements of the planetary gearset to each other.

In some embodiments of the variable transmission, the any two elements are arbitrarily chosen depending on physical constraints placed on the transmission.

In some embodiments of the variable transmission, the REV clutch provides negative speeds, and synchronization during braking and directional shifts. In some embodiments of the variable transmission, the FWD clutch provides positive speeds, and synchronization during braking and directional shifts.

In some embodiments of the variable transmission, the variator (CVP) is connected to the sun of the planetary gearset in both the IVT mode and the direct drive mode. In some embodiments of the variable transmission, the variator (CVP) is always connected to the power source (ICE) and to the sun gear.

In some embodiments of the variable transmission, when operating in the power recirculation (IVT) mode, the carrier is connected to the ICE through the second gear ratio and turns at a constant speed.

In some embodiments of the variable transmission, when operating in the direct drive mode, the planetary gearset is locked in a 1:1 ratio and all power flows through the CVP and is turning at the same speed.

In some embodiments of the variable transmission, the two mode gearbox consists of the variator (CVP) and a single planetary gearset.

In some embodiments of the variable transmission, during normal operation within one mode, only the IVT clutch or DIR clutch and the FWD clutch or REV clutch is active or closed. In some embodiments of the variable transmission, both of the IVT and DIR clutches and both of the FWD and REV clutches can be active during transitions between modes or during braking.

Provided herein are three configurations based on a multimode operation. These configurations are based on a three-mode solution, each mode being selected by engaging a clutch/brake while releasing the others. A planetary gear set is the central part of the configurations together with the CVP.

The central part of these configurations is the variator. A ball ramp on each side of the variator provides the clamping force necessary to transfer the torque. The use of a simple or compound planetary gear set in combination with a simple CVP variator provides IVT functionalities such as standstill and reverse. No starting device like a slipping clutch or torque converter is required, since the IVT capability handles the starting function. However, these devices might be added to allow a safety disconnect, or to start the engine with reduced load. A ratio after the planetary (Ratio SR_AR) is required to achieve the maximum speeds and torques of the vehicle. The output of the transmission is provided on the outer ring element of the planetary.

Provided herein is a variable transmission based on multimode operation comprising: an input shaft; a first portion of a first clutch drivingly engaged to the input shaft; a first gear of a first gear ratio drivingly engaged about the input shaft; wherein the first gear ratio comprises the first gear drivingly engaged to a second gear wherein the second gear is engaged and centered about an offset shaft; a hollow shaft centered about the input shaft comprising a second portion of the first clutch drivingly engaged to the hollow shaft, a third portion of a second clutch drivingly engaged to the hollow shaft and a third gear of a second gear ratio drivingly engaged to the hollow shaft; wherein the second gear ratio comprises a third gear drivingly engaged to a fourth gear; a fourth portion of the second clutch centered about the input shaft and fixed to a casing; a variator (CVP) centered about the offset shaft comprising an input ring assembly drivingly engaged to the second gear, and an output ring assembly drivingly engaged to the offset shaft; wherein the offset shaft is drivingly engaged to a sun gear of a planetary gear set; the planetary gear set comprising; the sun gear drivingly engaged to a set of planet gears, a carrier, and a ring gear engaged by the planet gears, wherein the ring gear is drivingly engaged to an output of a vehicle and to a fifth portion of a third clutch centered about the offset shaft; and wherein the carrier is connected to the fourth gear of the second gear ratio, wherein the fourth gear is engaged and centered about the offset shaft and is drivingly engaged to the third gear and to a sixth portion of the third clutch.

In some embodiments, the first clutch is an IVT clutch. In some embodiments, the second clutch is a reverse clutch. In some embodiments, the third clutch is a forward clutch.

In some embodiments, the third gear of the second gear ratio is connected to the transmission between the first clutch and the third clutch. However, it should be noted that the arrangement of the clutches and gears can be alternately arranged without changing the functionality of the transmission.

In some embodiments, the variable transmission comprises three modes of operation comprising: a direct drive forward (FWD) mode; a direct drive reverse (REV) mode; and a powersplit (IVT) mode.

In some embodiments, the powersplit (IVT) mode allows a seamless ratio shift from a negative ratio, to a powered neutral ratio and a positive ratio. In some embodiments, the power from the power source is split between a high efficiency mechanical path and the CVP variator path. In some embodiments, the IVT powersplit mode is capable of providing low speeds in forward and reverse directions. In some embodiments, the IVT powersplit mode provides a powered neutral mode. In still other embodiments, when operating in a powersplit (IVT) mode, the amount of power passing through the variator (CVP) may be greater than, equal to or less than the amount of power originating from a power source depending on the CVP ratio.

In other embodiments of the variable transmission, engagement of the direct drive FWD mode comprises: activating the third clutch to lock two elements of the planetary gearset to each other. In some embodiments, the two elements are arbitrarily chosen depending on physical constraints placed on the transmission. In some embodiments, the resulting direct drive ratio of the planetary gear set is 1:1. In other embodiments, the ratio of the transmission in FWD mode is a result of the first gear ratio and CVP ratio.

In still other embodiments of the variable transmission, engagement of the direct drive REV mode comprises: driving an incoming power source through the input shaft and the CVP, and activating the second clutch to ground the carrier of the planetary gearset to achieve a negative ratio. In some embodiments, the planetary gear is only used as a reduction ratio in the direct drive REV mode.

In some embodiments of the variable transmission, the second clutch provides negative speeds and synchronization during braking and directional shifts. In some embodiments, the third clutch provides positive speeds and synchronization during braking and directional shifts.

In some embodiments of the variable transmission, the first gear ratio is an up-speed ratio. In some embodiments, the variator (CVP) is always connected directly to an up-speed ratio and to the sun gear of the planetary gear set.

When operating in the powersplit (IVT) mode in some embodiments of the variable transmission, the variator (CVP) is connected directly to an up-speed ratio and to the sun gear of the planetary gear set, and the carrier is connected to the ICE through a first clutch and a second gear ratio.

In some embodiments, during normal operation within one mode, only one of the first clutch, the second clutch or the third clutch is active or closed at one time.

In some embodiments, both the third clutch and first clutch or both of the first clutch and second clutch can be active during transitions between modes.

In some embodiments, all three of the first clutch, the second clutch and the third clutch can be active during braking.

In some embodiments, the planetary gear set is a compound planetary gearset further comprising, at least a second set of planet gears.

Provided herein is a variable transmission based on multi-mode operation comprising: an input shaft; a first portion of a first clutch drivingly engaged to the input shaft; a third portion of a second clutch drivingly engaged to the input shaft; a first gear of a first gear ratio drivingly engaged about the input shaft; wherein the first gear ratio comprises the first gear drivingly engaged to a second gear and the second gear centered about an offset shaft; a first hollow shaft centered about the input shaft drivingly engaged to a second portion of the first clutch and to a third gear; a second hollow shaft centered about the input shaft drivingly engaged to a fourth portion of the second clutch and to a fifth gear; a variator (CVP) centered about the offset shaft comprising an input ring assembly drivingly engaged to the second gear, and an output ring assembly drivingly engaged to the offset shaft; wherein the offset shaft is drivingly engaged to a sun gear of a planetary gear set; the planetary gear set comprising; the sun gear drivingly engaged to a set of planet gears, a carrier, and a ring gear engaged by the planet gears; wherein the ring gear is drivingly engaged to an output of a vehicle; and wherein the carrier is drivingly engaged to a sixth gear, to a fourth gear and to a fifth portion of a third clutch located on a countershaft; wherein a second gear ratio comprises the fourth gear drivingly engaged to the third gear; wherein a third gear ratio comprises the sixth gear drivingly engaged to the fifth gear; wherein a sixth portion of the third clutch is fixed to the casing.

In some embodiments, the first clutch is an IVT clutch. In some embodiments, the second clutch is a forward clutch. In some embodiments, the third clutch is a reverse clutch.

In some embodiments of the variable transmission, the second gear ratio and the third gear ratio are connected to the transmission between the first clutch and the second clutch.

However, it should be noted that the arrangement of the hollow shafts, clutches and gears can be alternately arranged without changing the functionality of the transmission. It is also worth noting that the hollow shafts and clutches can also be placed on the offset shaft instead of the input shaft, since the function of a clutch is to interrupt a powerpath.

In some embodiments, the variable transmission comprises three modes of operation comprising: a powersplit forward (FWD) mode; a direct drive reverse (REV) mode; and a powersplit (IVT) mode.

In some embodiments, the powersplit (IVT) mode provides a seamless ratio shift from a negative ratio, to a powered neutral ratio and a positive ratio. In some embodiments, power from a power source is split between a high efficiency mechanical path and a CVP variator path.

In some embodiments, the IVT powersplit mode is capable of providing low speeds in forward and reverse directions. In some embodiments, the IVT powersplit mode provides a powered neutral mode.

In some embodiments of the variable transmission, engagement of the FWD mode comprises: activating the second clutch to connect the input shaft through the third gear ratio to the carrier.

In some embodiments of the variable transmission, engagement of the direct drive REV mode comprises: driving an incoming power source through the input shaft and the CVP, and activating the third clutch to ground the carrier of the planetary gearset to achieve a negative ratio.

In some embodiments of the variable transmission, the planetary gear is only used as a reduction ratio in the direct drive REV mode. In some embodiments, the third clutch provides negative speeds and synchronization during braking and directional shifts.

In some embodiments, the second clutch provides positive speeds and synchronization during braking and directional shifts.

In some embodiments, the first gear ratio is an up-speed ratio. In some embodiments, the variator (CVP) is always connected directly to an up-speed ratio and to the sun gear of the planetary gear set.

In some embodiments of the variable transmission, when operating in the powersplit (IVT) mode, the variator (CVP) is connected directly to an up-speed ratio and to the sun gear of the planetary gear set, and the carrier is connected to the ICE through a first clutch and a second gear ratio.

In some embodiments of the variable transmission, during normal operation within one mode, only one of the first clutch, the second clutch or the third clutch is active or closed at one time. In other embodiments, both the third clutch and first clutch or both of the first clutch and second clutch can be active during transitions between modes. In still other embodiments, all three of the first clutch, the second clutch and the third clutch can be active during braking.

In some embodiments of the variable transmission, the planetary gear set is a compound planetary gearset further comprising a second set of planet gears.

In some embodiments of the variable transmission, when operating in a powersplit (IVT) or in a forward (FWD) mode, the amount of power passing through the variator (CVP) may be greater than, equal to or less than the amount of power originating from a power source depending on the CVP ratio.

Provided herein is a variable transmission based on multi-mode operation comprising: an input shaft; a first portion of a first clutch drivingly engaged to the input shaft; a first gear of a first gear ratio drivingly engaged about the input shaft;

a third gear of a second gear ratio drivingly engaged about the input shaft; wherein the first gear ratio comprises the first gear drivingly engaged to a second gear and the second gear centered about an offset shaft; a variator (CVP) centered about the offset shaft comprising an input ring assembly drivingly engaged to the second gear, and an output ring assembly drivingly engaged to the offset shaft; wherein the offset shaft is drivingly engaged to a sun gear of a planetary gear set; the planetary gear set comprising; the sun gear drivingly engaged to a set of planet gears, a carrier, and a ring gear driven by the planets, wherein the ring gear is drivingly engaged to an output of a vehicle; and wherein the carrier is drivingly engaged to a third portion of a second clutch, to a fifth portion of a third clutch and to an eighth gear of a fourth gear ratio; a first hollow shaft centered about the offset shaft, drivingly engaged to a fourth portion of the second clutch and to a fourth gear of the second gear ratio; a second hollow shaft centered about the offset shaft, drivingly engaged to a sixth portion of the third clutch and to a sixth gear of a third gear ratio; and a third hollow shaft centered about the input shaft, drivingly engaged to a second portion of the first clutch and to a ninth gear of a fourth gear ratio; an idler shaft, drivingly engaged to a fifth gear of the second gear ratio and to a seventh gear of the third gear ratio; wherein the second gear ratio comprises the third gear, the fourth gear and the fifth gear; and wherein the third gear is drivingly engaged to the fourth gear and to the fifth gear; wherein the third gear ratio comprises the sixth gear and the seventh gear; and the sixth gear is drivingly engaged to the seventh gear; and wherein the fourth gear ratio comprises the eighth gear and the ninth gear; and the eighth gear is drivingly engaged to the ninth gear.

In some embodiments, the first clutch is an IVT clutch. In some embodiments, the second clutch is a forward clutch. In some embodiments, the third clutch is a reverse clutch. In some embodiments, the first gear ratio, the second gear ratio and the third gear ratio are connected to the input shaft after IVT clutch. However, it should again be noted that the arrangement of the hollow shafts, clutches and gears can be alternately arranged without changing the functionality of the transmission. It is also worth noting that the hollow shafts and clutches can also be placed on the offset shaft instead of the input shaft, since the function of a clutch is to interrupt a powerpath.

In some embodiments, the variable transmission comprises three modes of operation comprising: a powersplit forward (FWD) mode; a powersplit reverse (REV) mode; and a powersplit (IVT) mode.

In some embodiments, the powersplit (IVT) mode allows a seamless ratio shift from a negative ratio, to a powered neutral ratio and a positive ratio. In some embodiments, power from the power source is split between a high efficiency mechanical path and the CVP variator path. In some embodiments, the IVT mode provides a powered neutral mode.

In some embodiments of the variable transmission, engagement of the powersplit FWD mode comprises: activating the second clutch to connect the carrier to the ICE through the second gear ratio.

In some embodiments of the variable transmission, engagement of the powersplit REV mode comprises: activating the third clutch to connect the carrier to the ICE through the second and third gear ratios.

In some embodiments, the third clutch provides negative speeds, and synchronization during braking and directional shifts. In some embodiments, the second clutch provides positive speeds, and synchronization during braking and directional shifts.

In some embodiments of the variable transmission, when operating in the powersplit (IVT) mode, the variator (CVP) is connected directly to an up-speed ratio and to the sun gear of the planetary gear set, and the carrier is connected to the ICE through a first clutch and the fourth gear ratio. In some embodiments, during normal operation within one mode, only one of the first clutch, the second clutch or the third clutch is active or closed at one time. In other embodiments, both the third clutch and the first clutch, or both of the first clutch and second clutch can be active during transitions between modes. In still other embodiments of the variable transmission, all three of the first clutch, the second clutch and the third clutch can be active during braking.

In some embodiments of the variable transmission, the planetary gear set is a compound planetary gearset further comprising, at least a second set of planet gears.

In some embodiments, the variable transmissions described herein further comprise a torsional damper, wherein said torsional damper is located between an input power source and the input shaft to avoid or reduce transferring torque peaks and vibrations from the input power source to one or more of the input shaft, the first clutch, the second clutch, the third clutch, the variator, and the planetary gear set. In some embodiments, the torsional damper is coupled with a clutch.

Provided herein are embodiments of variable planetary transmissions comprising a traction fluid lubricant.

In some embodiments of the variable transmissions described herein, an input power source comprises an internal combustion engine (ICE).

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The continuously variable transmission speed ratio can have the advantage of providing a smoother and continuous transition from a low speed ratio to a high speed ratio. However, the prior continuously variable transmissions can be more complex than would be ideal.

Continuously Variable Transmissions or CVTs are of many types: belts with variable pulleys, toroidal, and conical, for non-limiting example. The principle of a CVT is that it enables the engine to run at its most efficient rotation speed by changing steplessly the transmission ratio in function of the speed of the car and the torque demand (throttle position) of the driver. If needed, for example when accelerating, the CVT is configured to also shift to the most optimum ratio providing more power. A CVT is configured to change the ratio from the minimum to the maximum ratio without any interruption of the power transmission, as opposed to the opposite of usual transmissions which require an interruption of the power transmission by disengaging to shift from one discrete ratio to engage the next ratio. A specific use of CVTs is the Infinite Variable Transmission or IVT. Where the CVT is limited to positive speed ratios, the IVT configuration can perform a neutral gear and even reverse ratios steplessly. A CVT can be used as an IVT in some driveline configurations.

Provided herein are configurations of CVTs based on a ball type variators, also known as CVP, for continuous variable planetary. Some general aspects of the CVTs and CVPs are described in US20040616399 or AU2011224083A1, incorporated herein by reference in their entirety.

Figure 1:
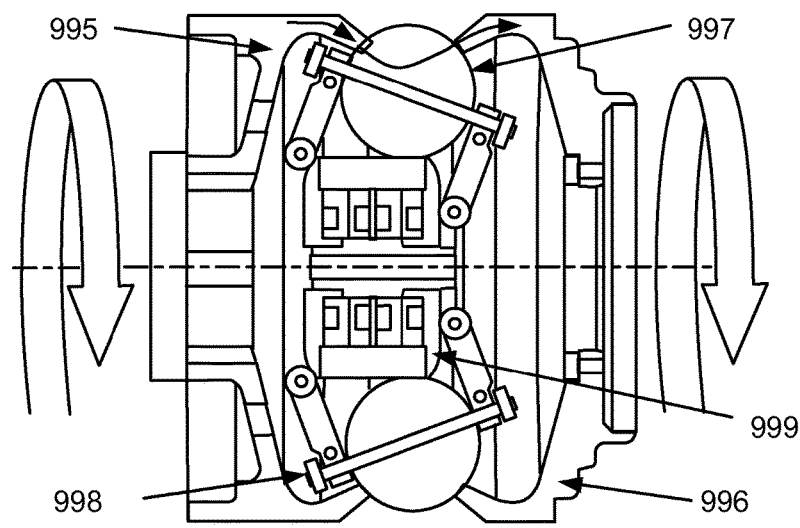
FIG. 1 is a side sectional view of a ball-type variator.

The type of CVT used herein, as shown on FIG. 1, is composed of a plurality of variator balls, 997, depending on the application, two discs, input disc, 995, and output disc, 996 or annular rings each having an engagement portion that engages the variator balls, 997. The engagement portions may be in a conical or toroidal convex or concave surface contact with the variator balls, 997, as input and output. The CVT may include an idler, 999, contacting the balls, 997, as well as shown on FIG. 1. The variator balls, 997, are mounted on axes, 998, themselves held in a cage or carrier allowing changing the ratio by tilting the variator balls' axes, 998. Other types of ball CVTs also exist, such as the one produced by Milner but are slightly different. These alternative ball CVTs are additionally contemplated herein. The working principle generally speaking, of a ball-type CVT is shown in FIG. 2.

Figure 2:
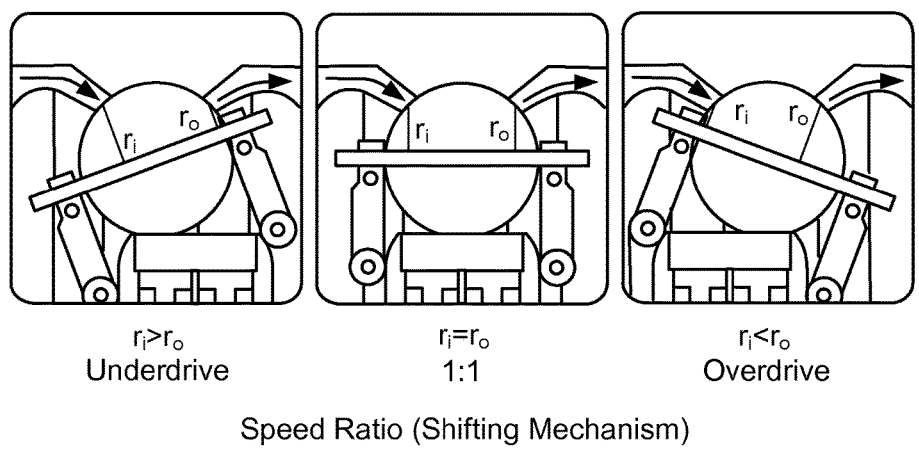
FIG. 2 is a magnified, side sectional view of a ball of a variator of FIG. 1 having a symmetric arrangement of a first ring assembly and a second ring assembly.

As shown in FIG. 1 or 2, a variator is a system that uses a set of rotating and tilting balls in a carrier that is positioned between an input ring and an output ring. Tilting the balls changes their contact diameters and varies the speed ratio. Contacting a rotating sphere at two different locations relative to the sphere's rotational axis will provide a "speed ratio", which can range from underdrive to overdrive depending on the location of the contact points for input and output torque and speed. As a result, the variator system offers continuous transition to any ratio within its range. The gear ratio is shifted by tilting the axes of the spheres in a continuous fashion, to provide different contact radii, which in turn drive the input and output rings, or discs.

The variator, as noted above, has multiple balls to transfer torque through multiple fluid patches. The balls are placed in a circular array around a central idler (sun) and contact separate input and output traction rings engagement portions. This configuration allows the input and output to be concentric and compact. The result is the ability to sweep the transmission through the entire ratio range smoothly, while in motion, under load, or stopped.

The main working principle of a CVT is that it enables the engine to run at its most efficient rotation speed by changing seamlessly the transmission ratio as a function of the vehicle speed. Moreover, the CVT can also shift to a ratio providing more power if higher acceleration/performance is needed. A CVT can change the ratio from the minimum to the maximum ratio without any interruption of the power flow, unlike conventional transmissions which cause a jerk during ratio shifts. A specific use of CVTs is the Infinite Variable Transmission or IVT. Whereas the CVT is limited to positive speed ratios, the IVT configuration can perform a neutral gear and even reverse ratios continuously. A CVT can also be used as an IVT in some driveline configurations.

A typical CVT design example is the "VariGlide" Technology, which represents a rolling traction drive system, transmitting forces between the input and output rolling surfaces through shearing a thin fluid film. The technology is called "Continuously Variable Planetary" (CVP) due to its analogous operation to a planetary gear system. The system consists of an input disc (ring) driven by the power source, an output disc (ring) driving the CVP output and a set of balls rotating on its own axle and is fitted between these two discs and a central sun as illustrated in FIG. 1.

The variator itself works with a traction fluid. A traction fluid is optionally located in the variator for lubrication and traction. The torque from the input power source is transferred between input ring, balls and output ring using a thin layer of traction fluid also known as elasto-hydrodynamic lubrication—EHL. The discs are clamped onto the balls tightly to achieve the clamping force required to transmit the torque. The lubricant between the ball and the conical rings acts as a solid at high pressure. When this fluid undergoes high contact pressures under rolling contact between the two very hard elements, the balls and the rings, the fluid undergoes a near-instantaneous phase transition to an elastic solid. Within this patch of traction the molecules of the fluid stack up and link to form a solid, through which shear force and thus torque can be transferred. Note that the rolling elements are actually not in physical contact when the elements are rotating. The power is thus transferred from the first ring assembly (input of the variator), through the variator balls, to the second ring assembly (output of the variator). By tilting the variator balls' axes, the ratio is changed between input and output. When the axis of each of the variator balls is horizontal the ratio is one, when the axis is tilted the distance between the axis and the contact point change, modifying the overall ratio, between underdrive and overdrive. All the variator balls' axles are tilted at the same time and same angle with a mechanism included in the cage.

The embodiments of the present invention as described herein will find useful applications in compact Off-Highway applications such as compact wheel loaders having a wide speed range and high rimpull force requirement where an operator may also desire limited jerking motion during shifts in the low speed range.

The embodiments of the present invention as described herein will also find many other applications. For example, although reference is made to OH vehicular applications, the continuously variable transmission as described herein can be used in many applications where wide speed ranges and/or high rimpull force requirements exist, such as for example, off-road leisure vehicles (Jeeps®, or other crossover vehicles), military vehicles, and other heavy duty applications.

Figure 3:
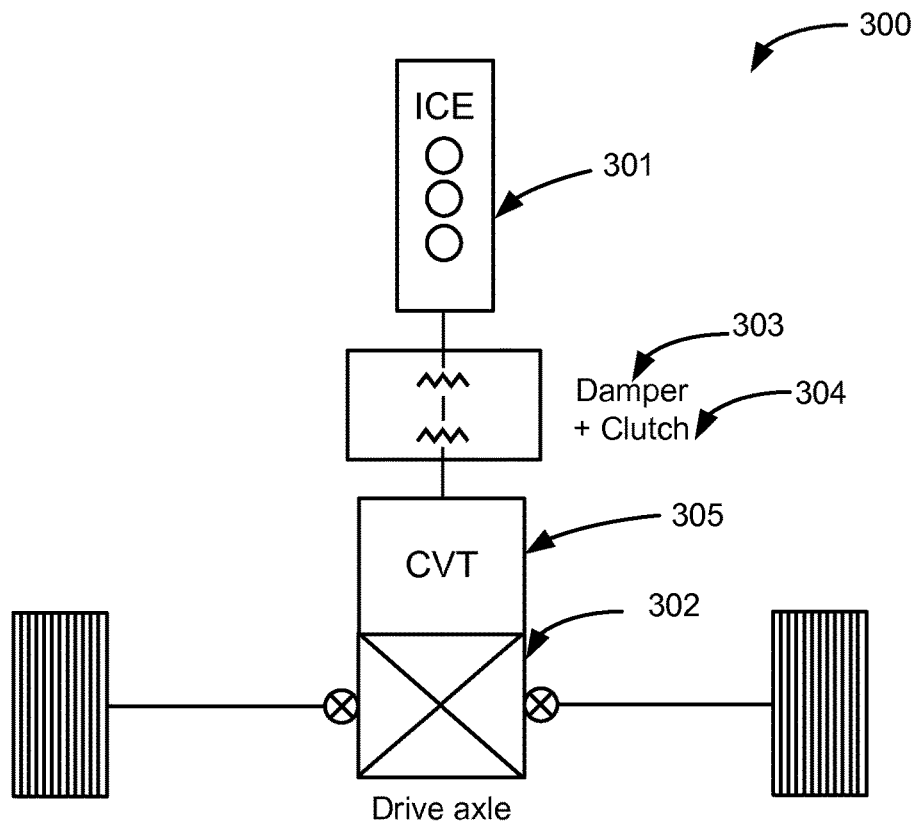
FIG. 3 is a block diagram of a typical continuously variable transmission (CVT) used in an Off-Highway (OH) vehicle.

A typical drivetrain for an Off-Highway (OH) vehicle 300 is shown below in FIG. 3. The CVT, 305, is used to replace traditional transmission and is located between the engine, ICE, 301, or internal combustion engine or other power source, and the differential, 302, as shown on FIG. 3. A torsional dampener, 303, alternatively called a damper, may be introduced between the engine, 301, and the CVT, 305, to avoid transferring torque peaks and vibrations that could damage the CVT, 305. In some configurations this dampener, 303, can be coupled with a clutch, 304, for the starting function or to allow the engine to be decoupled from the transmission. Other types of CVT's (apart from ball-type traction drives) can also be used as the variator in this layout.

In addition to the configurations above where the variator is used directly as the primary transmission, other architectures are possible. Various powerpath layouts can be introduced by adding a number of gears, clutches and simple or compound planetaries. In such configurations, the overall transmission can provide several operating modes; a CVT, an IVT, a combined mode and so on.

Provided herein are three configurations based on a two stage gearbox. The first stage provides a multi-mode configuration combining power-split modes (IVT (with geared neutral functionality) and Overdrive (OD)), and direct drive modes. The second stage is the directional stage to select driving either forward or reverse with a pair of direction clutches. The main difference between the three configurations concerns the first stage and especially the number of modes or their components.

The first configuration, alternately referred to as a 3*2 Mode-Wide configuration, is based on a three mode gearbox with directional stage. The shifts between the three modes are designed to be smooth and unnoticeable. The shifts between the forward and reverse clutch will typically happen around zero speed while the IVT functionality will provide a powered neutral mode.

Figure 4:
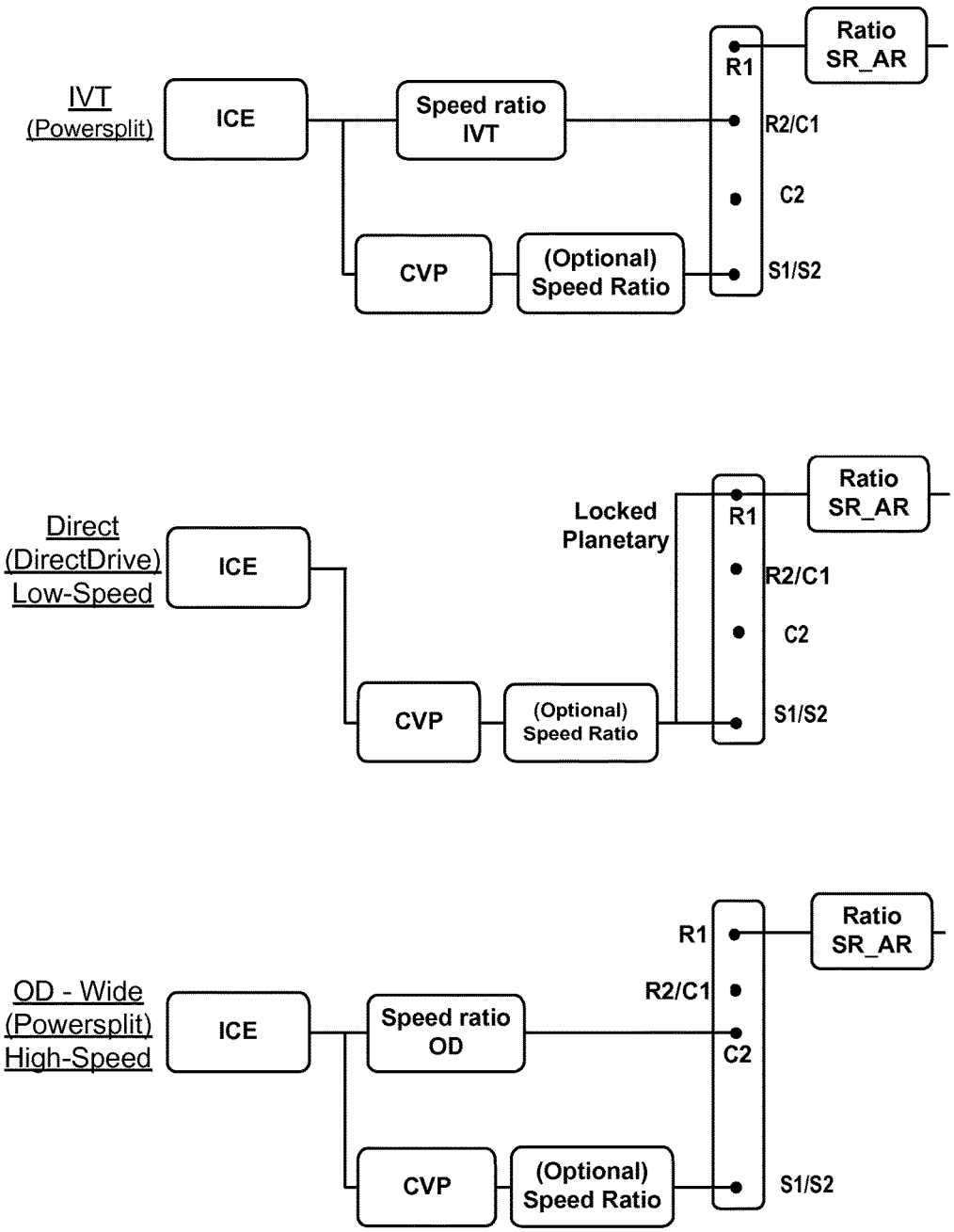
FIG. 4 is an illustrative view of an exemplary three-mode gearbox with directional stage, and two simple planetary gear sets or a dual planetary gearset illustrating the three modes provided by the first stage of the gearbox.
Figure 5:
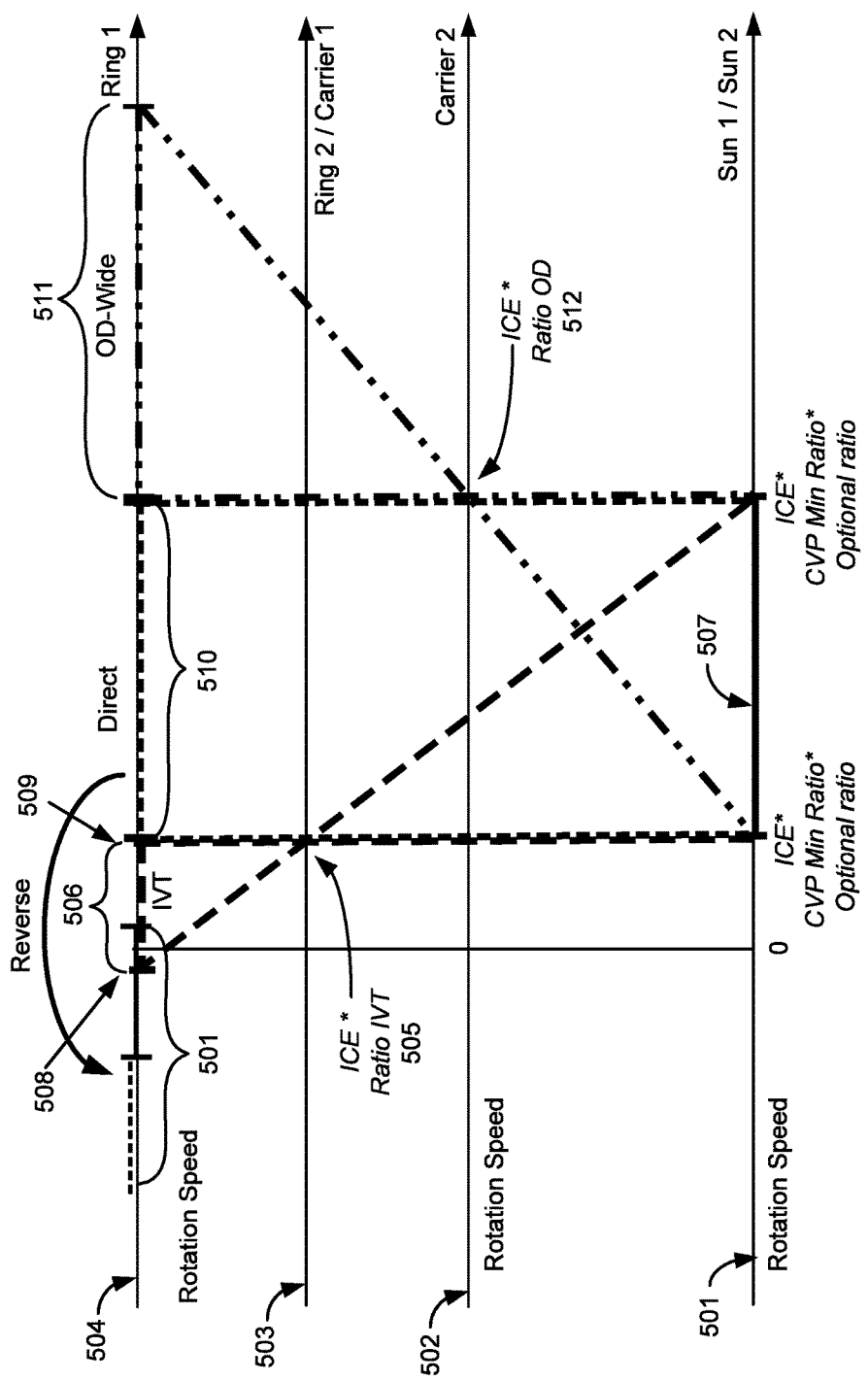
FIG. 5 is an illustrative view of the speed diagram of the planetary gear set illustrated in FIG. 4
Figure 6:
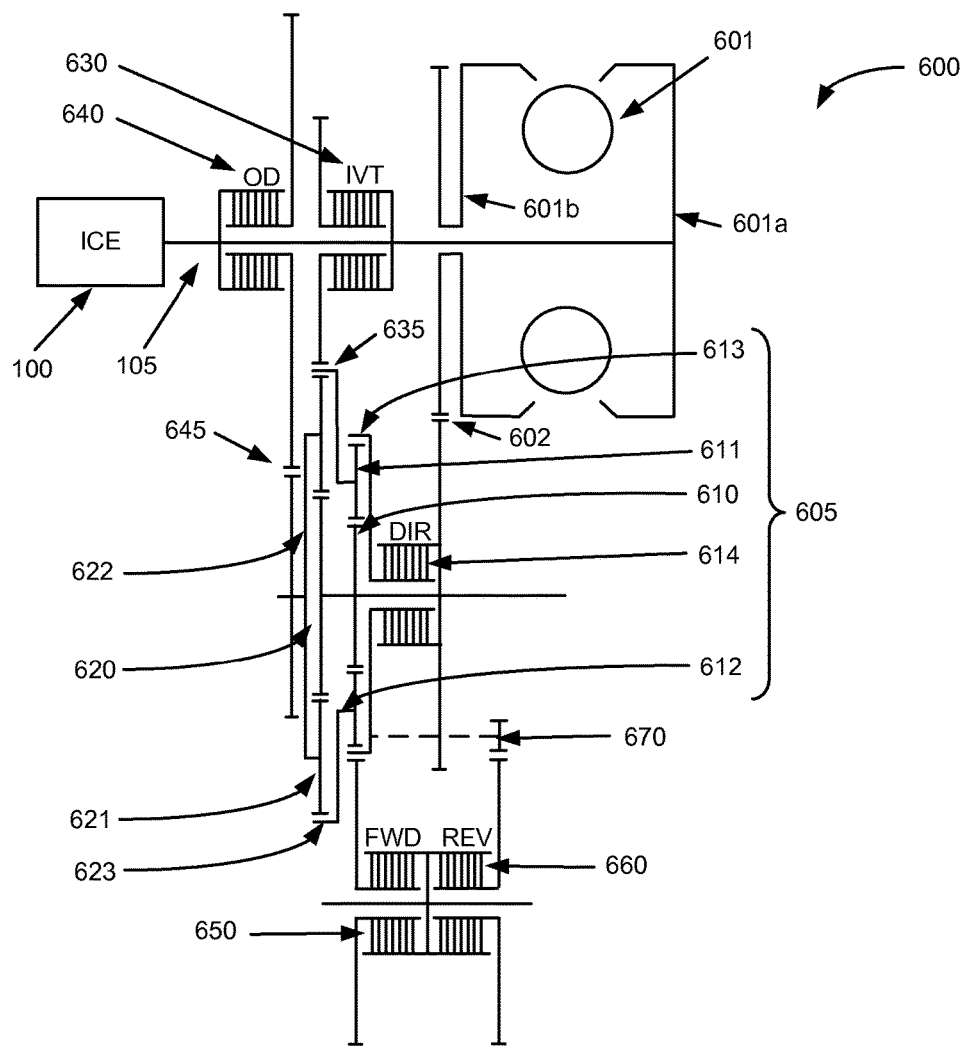
FIG. 6 is an illustrative view of a physical layout of the configuration of FIG. 4

FIG. 4 shows the three modes provided by the first stage of the gearbox. The gearbox consists of a CVP variator and two simple planetary gear sets, alternatively referred to as a dual planetary gearset. Several planetary configurations may be used to provide the same functionalities, however the example used in FIGS. 4-6 is a dual sun planetary whose suns are connected to each other.

The CVP output is connected to the dual sun of the dual planetary in all the modes. An additional ratio other than unity can be added on either side of the CVP (between the CVP and the sun or the engine), as shown in FIG. 4. The additional ratio would only change the overall ratio slightly, keeping the same working principle of the configuration. The first ring of the planetary is connected to forward and reverse clutches which ultimately connect the ring to the output of the transmission in all three modes.

The first mode is a power recirculation mode named, Infinitely Variable Transmission (IVT), as it allows a seamless ratio shift from a negative ratio to powered neutral and forward speed ratios. In this mode, the first carrier/second ring is connected to the ICE through a gear ratio: "Speed ratio IVT". In this mode, the power is split between a high efficiency mechanical path and the CVP variator path. Some power-recirculation will be present in order to provide speed ratios close to zero.

The second mode is a direct drive mode, in which two elements of the first planetary gear set are connected to each other. Doing so, the planetary is locked in a 1:1 ratio and all power flows through the CVP. It should be noted that the planetary elements to be locked are chosen arbitrarily and may change depending on physical constraints or other considerations.

The third mode is a powersplit mode named Over-Drive (OD) mode as it provides the high speeds and increases the spread of the transmission. In this mode, the second carrier is connected to the ICE by another gear ratio: "Speed ratio OD". Similar to the first mode, the power is split between a high efficiency mechanical path and the CVP variator path.

Adjacent to these three modes, two clutches provide the positive and negative speeds, plus the required synchronization during braking & directional shifts. Some overlap is thus needed between the IVT mode, with the forward clutch engaged, and the IVT mode, with the reverse clutch engaged. This range will provide the powered neutral functionality as well.

The main component providing the variable ratios of this configuration is the CVP variator, described previously. A ball ramp on each side of the variator provides the clamping force necessary to transfer the torque. Due to the two simple planetary gear sets, the configuration is able to provide zero speed and reverse ratios as in an IVT by just using a simple CVP variator. No starting device like a slipping clutch or torque converter is required, since the IVT capability addresses the starting function. However, additional components may be necessary for "safety-disconnect" or "engine-disconnect" functions. The ratio after the planetary (Ratio SR_AR) is required to ensure that the maximum speed and torque requirements of the vehicle are still achieved. The output of the transmission is made on the outer (i.e. ring) element of the planetary.

FIG. 5 illustrates the speed diagram of the two simple planetary gear sets, used within this configuration. The four horizontal axes represent respectively, from the bottom to the top, the dual sun rotation speed 501, the second carrier rotation speed 502, the second ring/first carrier rotation speed 503 and the first ring rotation speed 504.

The first ring is always used as the output of the planetary and goes to the directional stage before exiting on the axle. The CVP input is always connected to the ICE and the CVP output is always connected to the common sun gears of the two simple planetary gear sets on the other side; however, ratios other than unity may be present on both sides of the CVP. Speeds that can be reached by the CVP by only adjusting its ratio are shown on the sun axis as a bold area 507.

In the IVT mode, the second ring is connected to the ICE through a gear ratio 505 and thus always turns at a constant speed. The output of the first stage thus provides speed that can be seen as area 506 on the first axis. If the Forward clutch is engaged, a maximum speed ratio of the CVP corresponds to slightly negative speed at the output 508 while a minimum speed ratio in the CVP brings the IVT mode to its largest positive speed 509.

In the Direct Drive mode, the planetary is locked in a 1:1 ratio and the output of the first stage is thus turning at the same speed as the CVP output. This mode is shown in area 510 on the speed diagram.

The Over-Drive mode is shown by feature 511 and similarly to the IVT mode, the second carrier turns at the engine speed times an overdrive ratio 512 and provides and over-drive output.

The second stage of the transmission is composed of two simple clutches to select forward or reverse. By engaging the reverse clutch the three areas shown will be reflected for reverse region as shown in area 513 on the speed diagram. A small overlap is then available between the two IVT modes as explained above.

The shifts between the three modes are designed to be smooth and synchronous meaning that the CVP ratio, as well as the speeds of all other components will remain the same before, during and after the mode-shift.

FIG. 6 illustrates an example of physical layout for this configuration 600. The view is taken from the side of the vehicle. The input shaft 105 is linked to the CVP 601 whose output is connected to the first sun 610 of the dual simple planetary 605 through a gear ratio 602. A direct drive clutch, DIR 614, is present in the planetary 605 to lock two elements together and thus set the planetary to a 1:1 ratio. The ICE 100 is also linked to the clutches for the IVT mode 630 and the OD mode 640. In the OD mode the ICE speed is connected through a gear ratio 645 to the second carrier 622 of the dual simple planetary. The output of the IVT clutch is connected to the second ring 623 of the dual simple planetary which is linked to the first carrier. The two suns 610, 620 of the dual simple planetary are connected to each other. The output of the planetary, the first ring 613, is then connected to both a first part of the forward clutch 650 and to the reverse clutch 660 through the idler shaft 670. These clutches are coupled to the output of the transmission.

In normal operation of the transmission 600, only one clutch of the first stage is closed at a time together with one of the forward or reverse clutches. However, during transitions between two adjacent modes, two clutches of the first stage can be applied at the same time without clutch slipping at the synchronous point. This is also possible while braking in order to dissipate energy in the transmission.

Provided herein is a variable transmission 600 based on a three mode gearbox with directional stage comprising: an input shaft 105; a variator (CVP) 601 comprising an input ring assembly 601a drivingly engaged to the input shaft, and an output ring assembly 601b; a dual planetary gear set 605 comprising; a direct (DIR) drive clutch 614, a first planetary gearset comprising the elements: a first sun gear 610, a first set of planet gears 611, a first carrier 612, and a first ring gear 613, and a second planetary gearset comprising the elements: a second sun gear 620, a second set of planet gears 621, a second carrier 622 and a second ring gear 623, wherein the variator (CVP) output 601b is connected to the first sun 610, and wherein the variator (CVP) 601 may also be connected to an optional first gear ratio 602; an infinitely variable transmission (IVT) clutch 630 and an overdrive (OD) clutch 640 linked to the input shaft 105 between a power source (ICE) 100 and the variator; wherein the ICE 100 is connected through the output of the OD clutch to the second carrier 622 through a second gear ratio 645; and wherein the output of the IVT clutch is connected to the second ring 623 through a third gear ratio 635 which is linked to the first carrier 612; the first sun gear 610 and the second sun gear 620 are connected to form a dual sun gear set; the first ring gear 613 (output) is drivingly engaged to a first part of a forward (FWD) clutch 650 and to a reverse idler shaft 670 (REV-IS) wherein, the reverse idler shaft 670 (REV-IS) is connected to an output of the variable transmission through a reverse (REV) clutch 660.

In some embodiments of the variable transmission the optional first gear ratio 602 is connected to the transmission before the variator (CVP) 601, or between the variator (CVP) and the first sun gear 610, or not included in the transmission.

In some embodiments, the variable transmission comprises three modes of operation comprising: a power recirculation (IVT) mode; a direct drive mode; and a powersplit (OD) mode.

In some embodiments of the variable transmission, the power recirculation (IVT) mode allows a seamless ratio shift from a negative ratio to a powered neutral ratio and positive ratios. In some embodiments of the variable transmission, the power from the power source is split between a high efficiency mechanical path and the CVP variator path. In some embodiments of the variable transmission, the power-recirculation is present in order to provide speed ratios close to or equal to zero.

In some embodiments of the variable transmission, the direct drive mode comprises: the direct (DIR) drive clutch 614 configured to lock any two elements of the first planetary gearset to each other (610-613). In some embodiments of the variable transmission, the any two elements are arbitrarily chosen depending on physical constraints placed on the transmission.

In some embodiments of the variable transmission, the powersplit (OD) mode provides high speeds and increases the spread of the transmission. In some embodiments of the variable transmission, the power from the power source is split between a high efficiency mechanical path and the CVP variator path.

In some embodiments of the variable transmission, the REV clutch 660 provides negative speeds, and synchronization during braking and directional shifts. In some embodiments of the variable transmission, the FWD clutch 650 provides positive speeds, and synchronization during braking and directional shifts.

In some embodiments of the variable transmission, the variator (CVP) 601 is always connected directly to the power source (ICE) 100 and to the dual sun gear set 610/620.

In some embodiments of the variable transmission, when operating in the power recirculation (IVT) mode, the second ring gear 623 is connected to the ICE 100 through a gear ratio 635 and turns at a constant speed.

In some embodiments of the variable transmission, when operating in the direct drive mode, the dual planetary gearset is locked in a 1:1 ratio and all power flows through the CVP.

In some embodiments of the variable transmission, when operating in the powersplit (OD) mode, the second carrier 622 is connected to the ICE 100 through a gear ratio 645 and turns at a constant speed.

In some embodiments of the variable transmission, the three mode gearbox consists of the variator (CVP) 601 and a dual planetary gearset 605.

In some embodiments of the variable transmission, during normal operation within one mode, only one of the IVT clutch 630 or OD clutch 640 and one of the FWD clutch 650 or REV clutch 660 is active or closed at one time.

In some embodiments of the variable transmission, both the IVT clutch and OD clutch and both of the FWD and REV clutches can be active during transitions between modes or during braking.

The second configuration, alternately referred to as a 3*2 Mode-Short configuration, is based on a three mode gearbox with directional stage. The shifts between the three modes are designed to be smooth and unnoticeable. The shifts between the forward and reverse clutch will typically happen around zero speed while the IVT functionality will provide a powered neutral mode. This configuration uses a single simple planetary gear set instead of the dual simple planetary in the first configuration. The spread of the configuration will thus be slightly smaller, while the working principle will remain the same.

Figure 7:
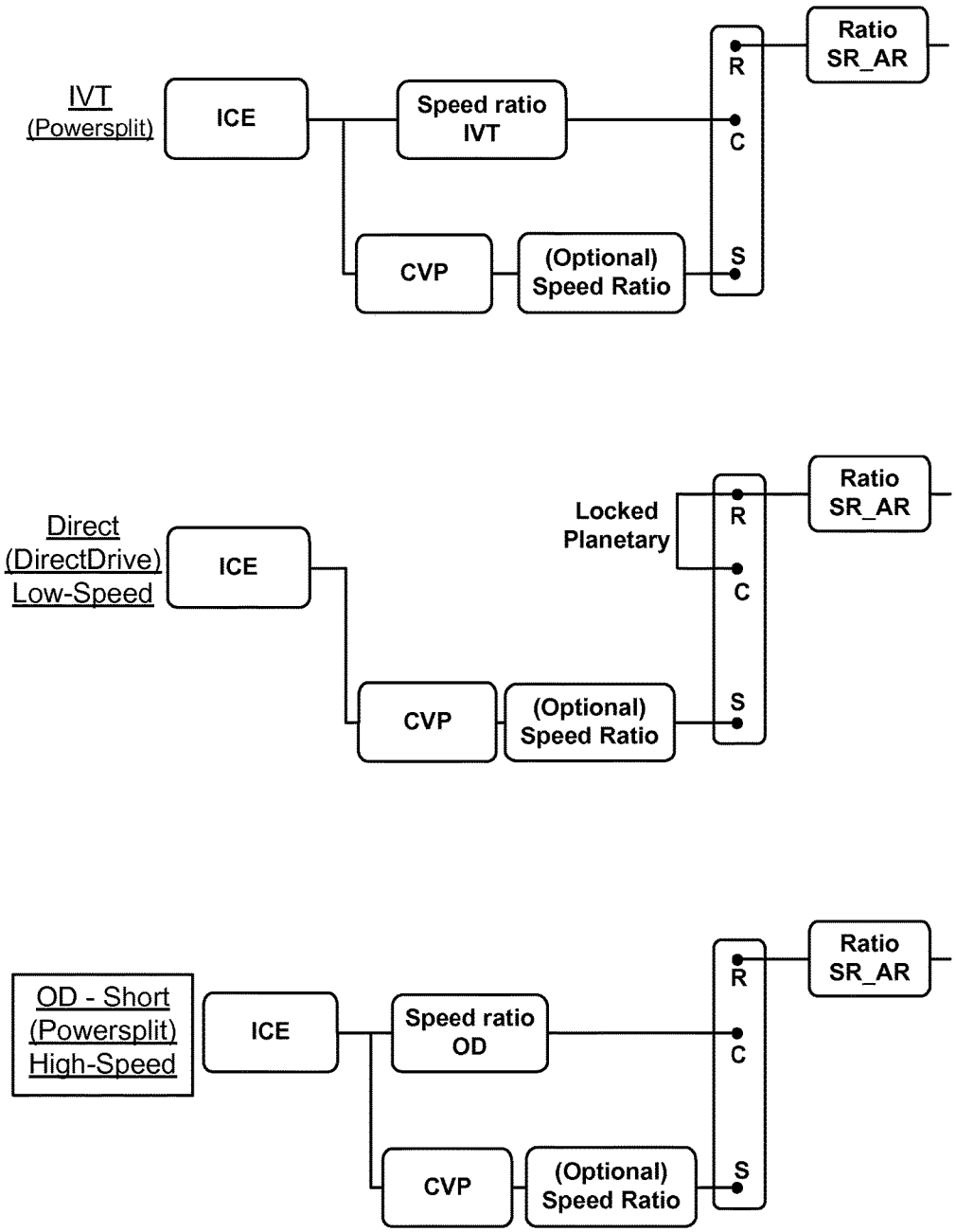
FIG. 7 is another illustrative view of a three mode gearbox with directional stage and a single planetary gearset illustrating the three modes provided by the first stage of the gearbox.

FIG. 7 shows the three modes provided by the first stage of the gearbox. The gearbox consists of a CVP variator and a single planetary set.

The CVP is connected to the sun of the planetary in all the modes. An additional ratio can be added on either side of the CVP (between the CVP and the sun or the engine), as shown in FIG. 7. The additional ratio would only change the overall ratio slightly, keeping the same working principle of the configuration. The ring of the planetary is connected through a pair of direction clutches to the output of the transmission in all three modes.

The three modes of this configuration are similar in function to the previous (3*2 Mode-Wide) configuration, and comprise: a power recirculation mode named Infinitely Variable Transmission (IVT); a direct drive mode; and a powersplit mode named Over-Drive (OD).

Figure 8:
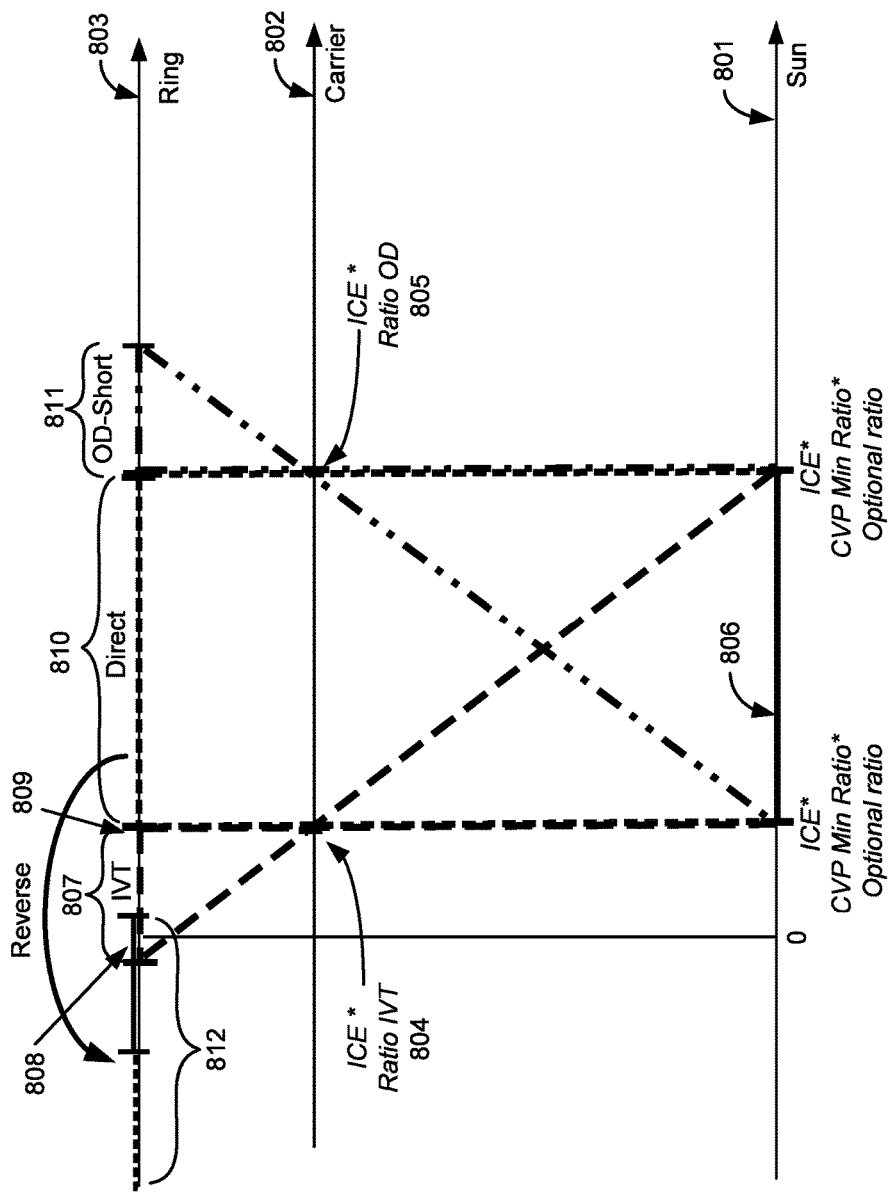
FIG. 8 is an illustrative view of the speed diagram of the planetary gear set illustrated in FIG. 7.

The main component providing the variable ratios of this configuration is the CVP variator, described previously. FIG. 8 shows the speed diagram of the (single) planetary gearset used within this configuration. The three horizontal axes represent respectively, from the bottom to the top; the sun rotation speed 801, the carrier rotation speed 802, and the ring rotation speed 803.

The ring is always used as the output of the planetary and goes to the directional stage before exiting on the axle. The CVP input is always connected to the ICE and the CVP output is always connected to the sun of the planetary on the other side; however, some ratios may be present on both sides of the CVP. Speeds that can be reached by the CVP by only adjusting its ratio are shown on the sun axis as a bold area 806.

In the IVT mode, the carrier is connected to the ICE through a gear ratio 804 and thus always turns at a constant speed. The output of the first stage thus provides speed that can be seen on the first axis as area 807. If the Forward clutch is engaged, a maximum speed ratio of the CVP corresponds to slightly negative speed at the output 808 while a minimum speed ratio in the CVP brings the IVT mode to its largest positive speed 809.

In the Direct Drive mode, the planetary is locked in a 1:1 ratio and the output of the first stage is thus turning at the same speed as the CVP output. This mode is shown in area 810 on the speed diagram.

The Over-Drive mode is shown in purple 811 and similarly to the IVT mode, the carrier turns at the engine speed times an overdrive ratio 805 and provides and over-drive output. The only difference in the working principle of this and the previous design is the spread of this OD mode.

The second stage of the transmission is composed of two simple clutches to select forward or reverse. By engaging the reverse clutch the areas shown as 807, 810 and 811 will be reflected for reverse region as shown in area 812 on the speed diagram. A small overlap is then available between the two IVT modes as explained above.

Figure 9:
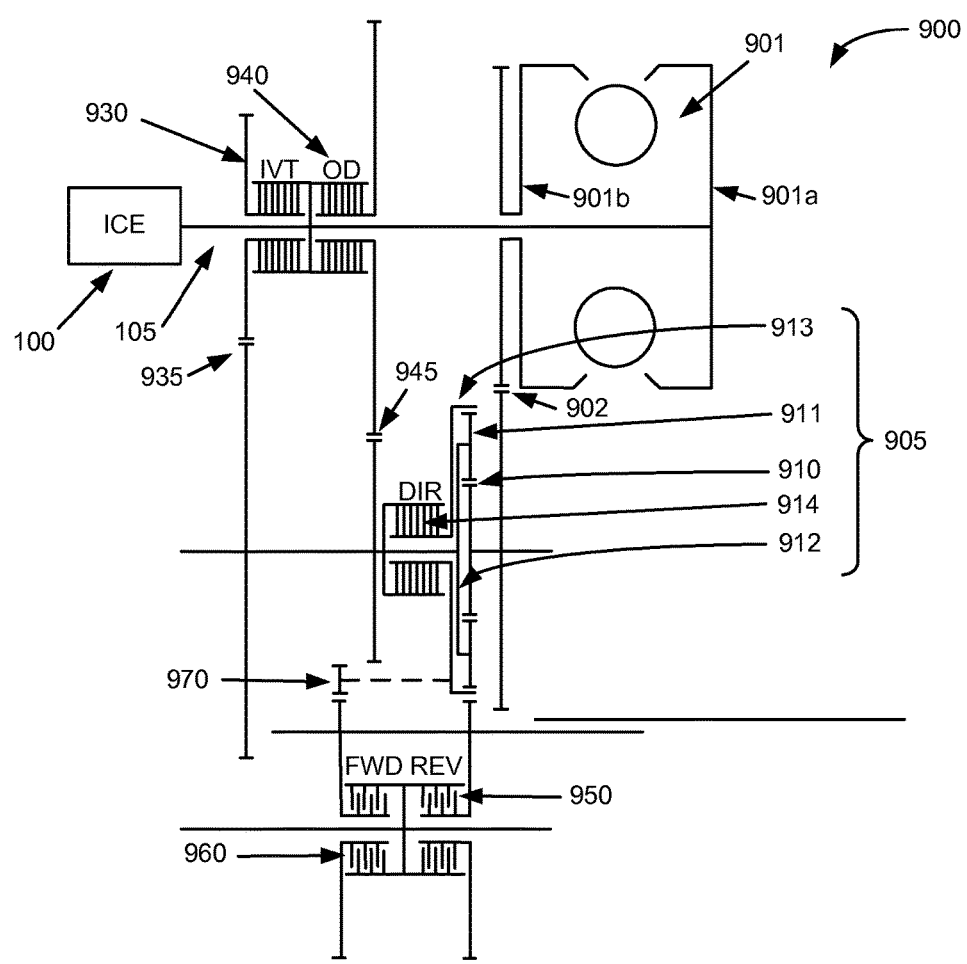
FIG. 9 is an illustrative view of a physical layout of the configuration of FIG. 7.

FIG. 9 shows an example of physical layout for this configuration 900. The view is taken from the side of the vehicle. The power source (ICE) 100 is linked through the input shaft 105 to the CVP 901 whose output is connected to the sun 910 of the planetary 905 through a first gear ratio 902. A direct drive clutch, DIR 914, is present in the planetary to lock two elements together and thus set the planetary to a 1:1 ratio. The ICE is also linked to the clutches for the IVT mode and the OD mode. In the OD mode the ICE speed is connected through a second gear ratio 945 to the carrier of the planetary. The output of the IVT clutch 930 is connected to the carrier 912 of the planetary. The output of the planetary, the ring 913, is then connected to both a first part of the forward clutch 950 and to the reverse clutch 960 through the idler shaft 970. These clutches are coupled to the output of the transmission.

In normal operation of the transmission 900, only one clutch of the first stage is closed at a time together with one of the forward or reverse clutches. However, during transitions between two adjacent modes two clutches of the first stage can be applied without slipping at the synchronous point. Away from the synchronous point, the additional clutch will function as a brake. This is also possible while braking in order to dissipate energy in the transmission.

Provided herein is a variable transmission based on a three mode gearbox with directional stage comprising: an input shaft 105; a variator (CVP) 901 comprising an input ring assembly 901*a* drivingly engaged to the input shaft 105, and an output ring assembly 901*b*; a single planetary gear set 905 comprising; a direct (DIR) drive clutch 914, and the planetary gear set elements: a sun gear 910, a set of planet gears 911, a carrier 912, and a ring gear 913; wherein the variator (CVP) 901 is connected to the first sun 910, and wherein the variator (CVP) 901 may also be connected to an optional first gear ratio 902; an infinitely variable transmission (IVT) clutch 930 and an overdrive (OD) clutch 940 linked to the input shaft 105 between a power source (ICE) 100 and the variator 901; wherein the ICE 100 is connected through the output of the OD clutch 940 to the carrier 912 through a second gear ratio 945; and wherein the output of the IVT clutch 930 is connected to the carrier 912 through a third gear ratio 935; the (output) ring gear 913 is drivingly engaged to a first part of a forward (FWD) clutch 950 and to a reverse idler shaft (REV-IS) 970 wherein, the reverse idler shaft (REV-IS) 970 is connected to an output of the variable transmission through a reverse (REV) clutch 960.

In some embodiments of the variable transmission 900, the optional first gear ratio 902 is connected to the transmission before the variator (CVP) 901, or between the variator (CVP) 901 and the first sun gear 910, or not included in the transmission.

In some embodiments, the variable transmission 900 comprises three modes of operation comprising: a power recirculation (IVT) mode; a direct drive (DIR) mode; and a powersplit (OD) mode.

In some embodiments of the variable transmission, the power recirculation (IVT) mode allows a seamless ratio shift from a negative ratio to a powered neutral ratio and positive ratios. In some embodiments of the variable transmission, the power from the power source is split between a high efficiency mechanical path and the CVP variator path. In some embodiments of the variable transmission, the power-recirculation will be present in order to provide speed ratios close to or equal to zero.

In some embodiments of the variable transmission 900, the direct drive mode comprises: the direct (DIR) drive clutch 914 configured to lock any two elements of the planetary gearset 905 to each other. In some embodiments of the variable transmission, the any two elements are arbitrarily chosen depending on physical constraints placed on the transmission.

In some embodiments of the variable transmission 900, the powersplit (OD) mode provides high speeds and increases the spread of the transmission. In some embodiments of the variable transmission, the power from the power source is split between a high efficiency mechanical path and the CVP variator path.

In some embodiments of the variable transmission 900, the REV clutch 960 provides negative speeds, and synchronization during braking and directional shifts. In some embodiments of the variable transmission, the FWD clutch 950 provides positive speeds, and synchronization during braking and directional shifts.

In some embodiments of the variable transmission 900, the variator (CVP) 901 is always connected directly to the power source (ICE) 100 and to the sun gear 910.

In some embodiments of the variable transmission 900, when operating in the power recirculation (IVT) mode, the carrier 912 is connected to the ICE 100 through the third gear ratio 935 and turns at a constant speed.

In some embodiments of the variable transmission 900, when operating in the direct drive mode, the dual planetary gearset is locked in a 1:1 ratio and all power flows through the CVP 901 and is turning at the same speed.

In some embodiments of the variable transmission 900, when operating in the powersplit (OD) mode, the carrier 912 turns at the speed of the power source 100 (ICE) times the second gear ratio 945 (OD ratio).

In some embodiments of the variable transmission 900, the three mode gearbox consists of the variator (CVP) 901 and a single planetary gearset 905.

In some embodiments of the variable transmission 900, during normal operation within one mode, only one of the IVT clutch 930 or OD clutch 940 and one of the FWD clutch 950 or REV clutch 960 is active or closed at one time. In some embodiments of the variable transmission, both the IVT clutch 930 and OD clutch 940 and both of the FWD clutch 950 and REV clutch 960 can be active during transitions between modes or during braking.

The third configuration is based on a two mode gearbox with directional stage. The shifts between the two modes are designed to be smooth and unnoticeable. The shifts between the forward and reverse clutch will typically happen around zero speed while the IVT functionality will provide a powered neutral mode. This configuration is similar to the second configuration, wherein the Overdrive mode has been removed to simplify the design (i.e. cost reduction).

Figure 10:
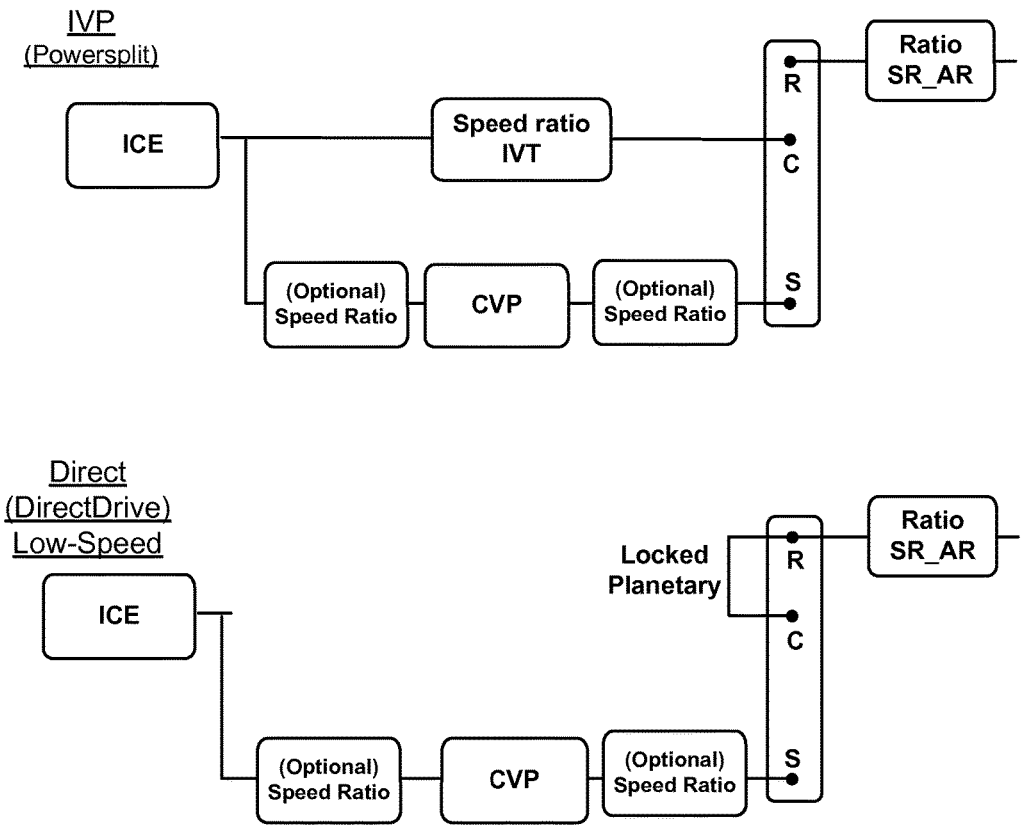
FIG. 10 is an illustrative view of an exemplary two-mode gearbox with clutches, and a single planetary gearset illustrating the two modes provided by the first stage of the gearbox.

FIG. 10 shows the two modes provided by the first stage of the gearbox. The gearbox consists of a CVP variator and a single planetary set.

The CVP 1201 is connected to the sun 1210 of the planetary 1205 in the two modes. An additional ratio 1202 can be added on either side of the CVP 1201 (between the CVP and the sun or the engine 100), as shown in FIG. 10. The additional ratio would only change the overall ratio slightly, keeping the same working principle of the configuration. The ring 1213 of the planetary is connected through a pair of direction clutches 1260, 1250 to the output of the transmission in all three modes.

The two modes of this configuration are similar in function to the two first modes (i.e. IVT and Direct Drive) of the previous two configurations, and comprise: a powersplit mode named Infinitely Variable Transmission (IVT); and a direct drive (low speed) mode. As noted earlier, the power-split mode named Over-Drive (OD) has been removed from this configuration to illustrate a lower cost configuration.

Figure 11:
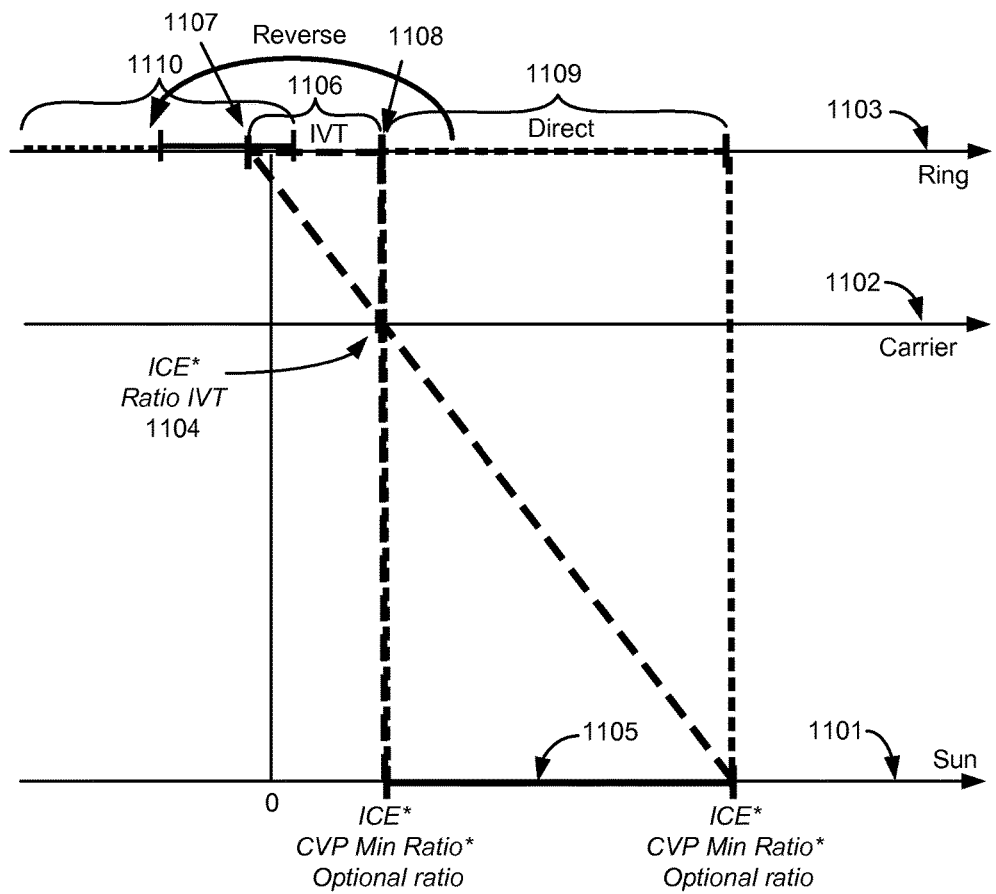
FIG. 11 is an illustrative view of the speed diagram of the planetary gear set illustrated in FIG. 10.

The main component providing the variable ratios of this configuration is the CVP variator, described previously. FIG. 11 shows the speed diagram of the planetary gearset used within this configuration. The three horizontal axes represent respectively, from the bottom to the top; the sun rotation speed 1101, the carrier rotation speed 1102, and the ring rotation speed 1103.

The ring is always used as the output of the planetary and goes to the directional stage before exiting on the axle. The CVP input is always connected to the ICE and the CVP output is always connected to the sun of the planetary on the other side; however, ratios other than unity may be present on both sides of the CVP. Speeds that can be reached by the CVP by only adjusting its ratio are shown on the sun axis as a bold area 1105.

In the IVT mode, the carrier is connected to the ICE through a gear ratio 1104 and thus always turns at a constant speed. The output of the first stage thus provides speeds that can be seen on the first axis as area 1106. If the Forward clutch is engaged, a maximum speed ratio of the CVP corresponds to slightly negative speed 1107 at the output while a minimum speed ratio in the CVP brings the IVT mode to its largest positive speed.

In the Direct Drive mode, the planetary is locked in a 1:1 ratio and the output of the first stage is thus turning at the same speed as the CVP output. This mode is shown in area 1109 on the speed diagram.

The second stage of the transmission is composed of two simple clutches to select forward or reverse. By engaging the reverse clutch the two areas shown will be reflected for reverse region as shown in area 1110 on the speed diagram. A small overlap is then available between the two IVT modes as explained above.

The shifts between the two modes are designed to be smooth and synchronous meaning that the CVP ratio, as well as the speeds of most other components will remain the same before, during and after the mode-shift.

Figure 12:
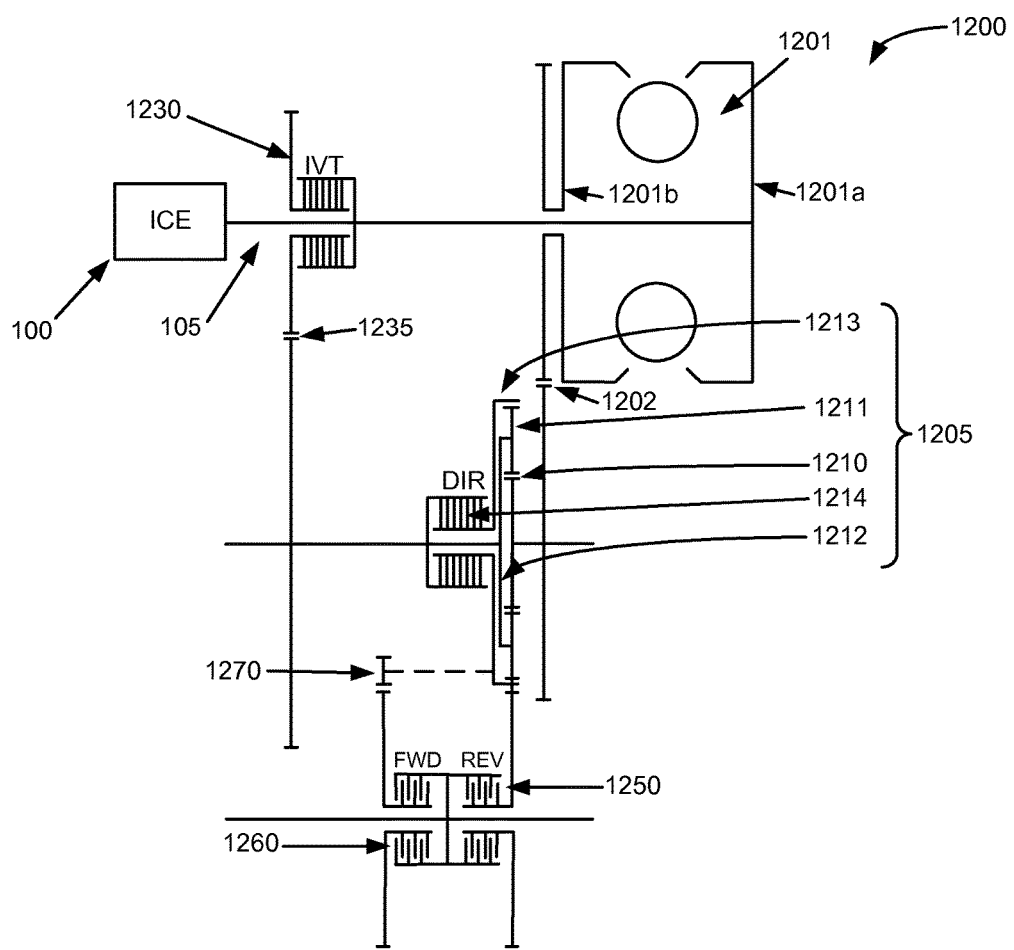
FIG. 12 is an illustrative view of a physical layout of the configuration of FIG. 10.

FIG. 12 shows an example of physical layout for this configuration 1200. The view is taken from the side of the vehicle. The input shaft 105 is linked to the CVP 1201 whose output is connected to the sun 1210 of the planetary 1205 through a gear ratio 1202. A direct drive clutch, DIR, 1214, is present in the planetary to lock two elements together and thus set the planetary to a 1:1 ratio. The ICE 100 is also linked to the clutch 1230 for the IVT mode. The output of the IVT clutch is connected to the carrier 1212 of the planetary. The output of the planetary, the ring 1213, is drivingly engaged to a first part of a forward (FWD) clutch 1250 and to a reverse idler shaft (REV-IS) 1270 wherein, the reverse idler shaft (REV-IS) 1270 is connected to an output of the variable transmission through a reverse (REV) clutch 1260.

In normal operation of the transmission 1200, only one clutch of the first stage is closed at a time together with one of the forward or reverse clutches. However, during transitions between two adjacent modes, two clutches can be applied without slipping at the synchronous point. Away from the synchronous point, the additional clutch will function as a break. This is also possible while braking in order to dissipate energy in the transmission.

Provided herein is a variable transmission 1200 based on a two mode gearbox with directional stage comprising: an input shaft 105; a variator (CVP) 1201 comprising an input ring assembly 1201a drivingly engaged to the input shaft 105, and an output ring assembly 1201b; a single planetary gear set 1205 comprising: a direct (DIR) drive clutch 1214 and the planetary gear set elements: a sun gear 1210, a set of planet gears 1211, a carrier 1212, and a ring gear 1213, wherein the variator (CVP) 1201 is connected to the sun 1210, and wherein the variator (CVP) 1201 may also be connected to an optional first gear ratio 1202; an infinitely variable transmission (IVT) clutch 1230 linked to the input shaft 105 between a power source (ICE) 100 and the variator 1201; wherein the ICE 100 is connected through the output of the IVT clutch 1230 to the carrier 1212 through a second gear ratio 1235; the (output) ring gear 1213 is drivingly engaged to a first part of a forward (FWD) clutch 1250 and to a reverse idler shaft (REV-IS) 1270 wherein, the reverse idler shaft (REV-IS) 1270 is connected to an output of the variable transmission through a reverse (REV) clutch 1260.

In some embodiments of the variable transmission 1200, the optional first gear ratio 1202 is connected to the transmission before the variator (CVP) 1201, or between the variator (CVP) 1201 and the first sun gear 1210, or not included in the transmission.

In some embodiments, the variable transmission comprises two modes of operation comprising: a power recirculation (IVT) mode; and a direct drive mode. In some embodiments of the variable transmission, the power recirculation (IVT) mode allows a seamless ratio shift between the IVT mode and the direct drive mode. In some embodiments of the variable transmission, the power from the power source is split between a high efficiency mechanical path and the CVP variator path. In some embodiments of the variable transmission, the power-recirculation will be present in order to provide speed ratios close to or equal to zero.

In some embodiments of the variable transmission 1200, the direct drive mode comprises: the direct (DIR) drive clutch 1214 configured to lock any two elements of the planetary gearset 1205 to each other. In some embodiments of the variable transmission 1200, the any two elements are arbitrarily chosen depending on physical constraints placed on the transmission.

In some embodiments of the variable transmission 1200, the REV clutch 1260 provides negative speeds, and synchronization during braking and directional shifts. In some embodiments of the variable transmission, the FWD clutch 1250 provides positive speeds, and synchronization during braking and directional shifts.

In some embodiments of the variable transmission 1200, the variator (CVP) 1201 is connected to the sun 1210 of the planetary gearset 1205 in both the IVT mode and the direct drive mode. In some embodiments of the variable transmission, the variator (CVP) 1201 is always connected to the power source (ICE) 100 and to the sun gear 1210.

In some embodiments of the variable transmission 1200, when operating in the power recirculation (IVT) mode, the carrier 1212 is connected to the ICE 100 through the second gear ratio 1235 and turns at a constant speed.

In some embodiments of the variable transmission 1200, when operating in the direct drive mode, the planetary gearset 1205 is locked in a 1:1 ratio and all power flows through the CVP 1201.

In some embodiments of the variable transmission 1200, the two mode gearbox consists of the variator (CVP) 1201 and a single planetary gearset 1205.

In some embodiments of the variable transmission 1200, during normal operation within one mode, only the IVT clutch 1230 or the DIR clutch 1214 and the FWD clutch 1250 or REV clutch 1260 is active or closed. In some embodiments of the variable transmission, both of the IVT and DIR clutches and both of the FWD and REV clutches can be active during transitions between forward and reverse or during braking.

Introduced herein are three configurations based on the same general principle. They all consist of two main stages. The first stage is a multi-mode gearbox while the second stage corresponds to two simple clutches for the forward and reverse. The mode selection in the first stage is made by engaging one of the three clutches while releasing the others. The direction selection in the second stage is made by engaging one of the two clutches while releasing the other.

The various modes and two directions allow the CVT to provide reverse speeds, forward speeds and powered neutral without any gap. Additionally, the shifts between adjacent modes are synchronous and can be made unnoticeable; providing for improved driving comfort and safety. The shift between the reverse and forward clutches is also done at zero speed and will thus be unnoticeable as well.

The present invention is not restricted to the particular embodiments shown and it is assumed that all the configurations that perform similarly to the speed diagram and generic layouts are part of the invention as well.

This configuration and its layout described herein provide a powered neutral ratio. The achieved spread is sufficient to allow an engine to operate at more optimal points, providing fuel economy, while keeping the same operating speeds.

The differences between these three designs are mainly complexity (cost & mechanical/physical constraints) vs. CVP size (operating torques). As the design is simplified by reducing content from 3×2 wide towards 2×2, the overall spread becomes narrower, which eventually results in high torques passing through the variator, which also implies a larger ball size of the variator for the same transmission output torque.

The 3×2 mode design also has the advantage of providing six modes (Rev OD-Rev DIR-Rev IVT-Fwd IVT-Fwd DIR-Fwd OD) with synchronous shifts between adjacent modes and requiring only five clutches. The existing technology of combining IVT-DIR-OD etc. will require one clutch for each mode. Additionally, it is recognized to be very difficult to execute the existing technology with six modes that have equal speed ratios in forward and reverse.

Provided herein are three configurations based on a multi-mode operation. These configurations are based on a three-mode solution, each mode being selected by engaging a clutch/brake while releasing the others. A planetary gear set is the central part of the configurations together with the CVP. The number of layouts can be extended with different mode combinations by changing the way the planetary gear is used. The planetary gear can be used as a summing differential, joining the input speeds and torques at two of its elements into an output speed and torque at its third element. It can also be used as a simple gear ratio, either by locking any two elements together or by grounding one element of choice. Moreover, using a compound planetary instead of a simple planetary provides more flexibility in optimizing gear ratios, and thus improved efficiency.

An important objective is to provide smooth and unnoticeable shifts between a certain reverse speed and a certain forward speed. Outside this area, non-synchronous shifts are acceptable. The layouts presented below consist of various operating modes, comprising direct drive and powersplit modes. All layouts comprise an IVT mode, allowing a powered neutral feature. In all the modes, the CVP device is run at a relatively high rotational speed and thus corresponding relatively low torque, with the principle objective of reducing the CVP size.

The central part of this configuration is the variator described previously. A ball ramp on each side of the variator provides the clamping force necessary to transfer the torque. The use of a simple or compound planetary gear set in combination with a simple CVP variator provides IVT functionalities such as standstill and reverse. No starting device like a slipping clutch or torque converter is required, since the IVT capability handles the starting function. However, these devices might be added to allow a safety disconnect, or to start the engine with reduced load. A ratio after the planetary (Ratio SR_AR) is required to achieve the maximum speeds and torques of the vehicle. The output of the transmission is provided on the outer ring element of the planetary.

Powersplit Modes

Some configurations have one or more powersplit modes, meaning that the mode will need two powerpaths between the ICE and the planetary gear set (PGS); as opposed to a direct mode, where all the power flows through the CVP path to the PGS.

In each Powersplit mode there is a sun gear spinning at a variable speed, depending on the CVP setting, and a carrier spinning at a discrete speed depending on which mode has been selected. For purposes of clarification, it is understood by those skilled in the art that a constant engine speed is assumed and that the carrier speed has a fixed relationship to the engine speed. For a particular RTS ratio, one can calculate the ring speed of the PGS, which is linked to the output of the gearbox. The ring speed can be calculated by a simple formula, or can be found graphically as is done in a speed diagram, as described below.

For each mode, two lines are drawn. One line is drawn from the bottom or lowest end of the Sun speed range, through the Carrier speed corresponding to the mode in question, extending to the Ring axis. A second line is drawn from the top or highest end of the Sun speed range, through the Carrier speed point, to the Ring axis. The intersection of these two lines with the Ring axis yield two points. The range between those two points is the speed range that can be achieved on the Ring in that specific mode by varying the CVP ratio. When this is done for all three modes, the total speed range of the gear box is visible on the Ring axis. The goal is to get the separate ranges to be adjoining in order to have a continuous speed range, or preferably to slightly overlap. This can be done by changing the gear ratios, which moves the Sun speed range and the Carrier speed points left or right. It can also be influenced by changing the Ring to Sun (RTS) ratio of the PGS; wherein a higher RTS number will move the entire Carrier axis up, and vice versa.

Direct Modes

Other configurations are called "direct modes". This means there is only one power path between the ICE and the output. Instead of using the PGS to join two power paths as is done in the powersplit modes, it is now functioning as a simple gear ratio.

When the carrier is grounded, it has zero speed. This is achieved with a clutch of which one part is literally fixed to the gearbox casing. The Carrier speed point on the Carrier axis is now on the vertical "0" axis. Drawing the two lines as described above, yields the corresponding Ring speed range. Since the Carrier has zero speed, positive Sun speeds will yield negative Ring speeds. This is why grounding the carrier is often used to get reverse speeds.

Another direct mode is obtained by locking two of the three PGS components to each other, which actually locks all three together. In this case, the Sun, Carrier and Ring speeds are identical. The Carrier speed is not the point described above, but rather a range identical to that of the Sun gear. The same situation applies for the Ring gear. The lines in the speed diagram are vertical.

Figure 13:
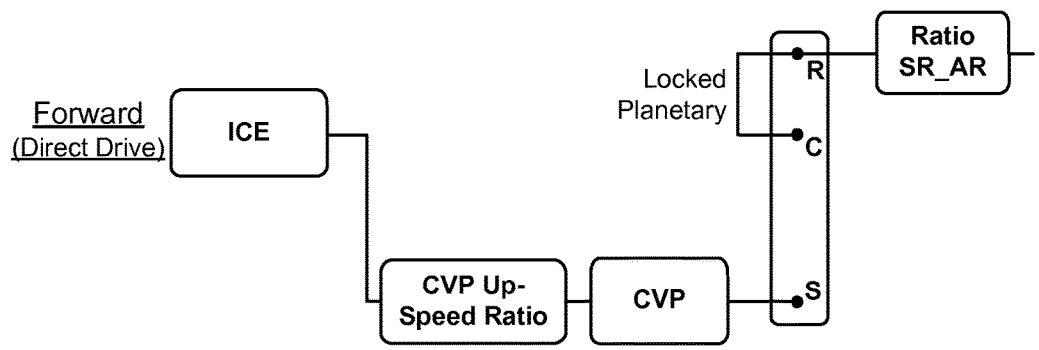
FIG. 13 is an illustrative view of an exemplary direct drive Forward (FWD) mode with a locked planetary gear set.

The first configuration is a transmission comprising two direct drive modes and one powersplit mode. The forward mode is shown in FIG. 13. This is a direct drive mode in which the planetary is locked in a 1:1 ratio; all the power is passing directly through the CVP and going to the output through the ring of the planetary. It can be arbitrarily chosen which of the two elements of the planetary are locked together in order to obtain the 1:1 ratio.

Figure 14:
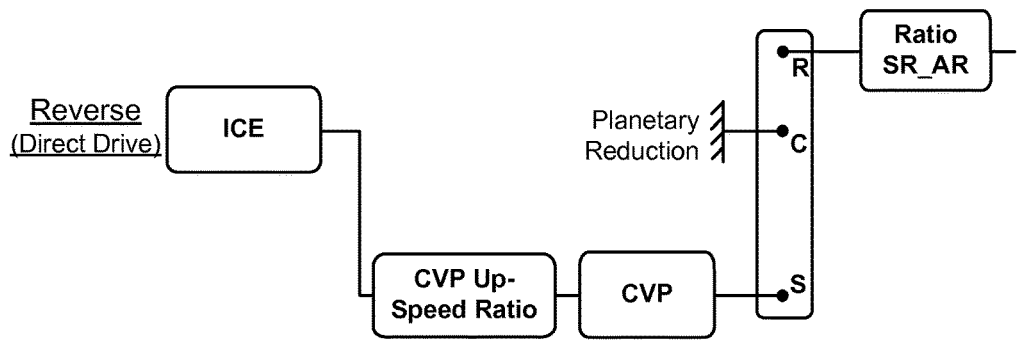
FIG. 14 is an illustrative view of an exemplary direct drive Reverse (REV) mode with a grounded planetary gear set carrier, where the sun gear, ring gear and planets all have non-zero speeds.

The Reverse mode, shown in FIG. 14, is also a direct drive mode, in the sense that all the power goes through the CVP and the planetary is only used as a reduction ratio by locking one of the elements to the ground; i.e. grounding; typically this is done with the carrier. If the carrier is locked, a negative ratio is achieved.

Figure 15:
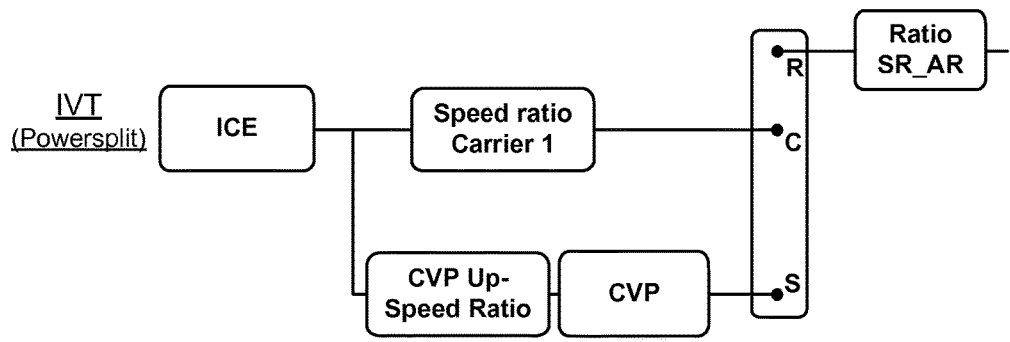
FIG. 15 is an illustrative view of an exemplary Infinitely Variable Planetary (IVT) powersplit mode where the CVP is still connected to the sun, but the engine is also connected to the carrier of the planetary gear set through a ratio.
Figure 16:
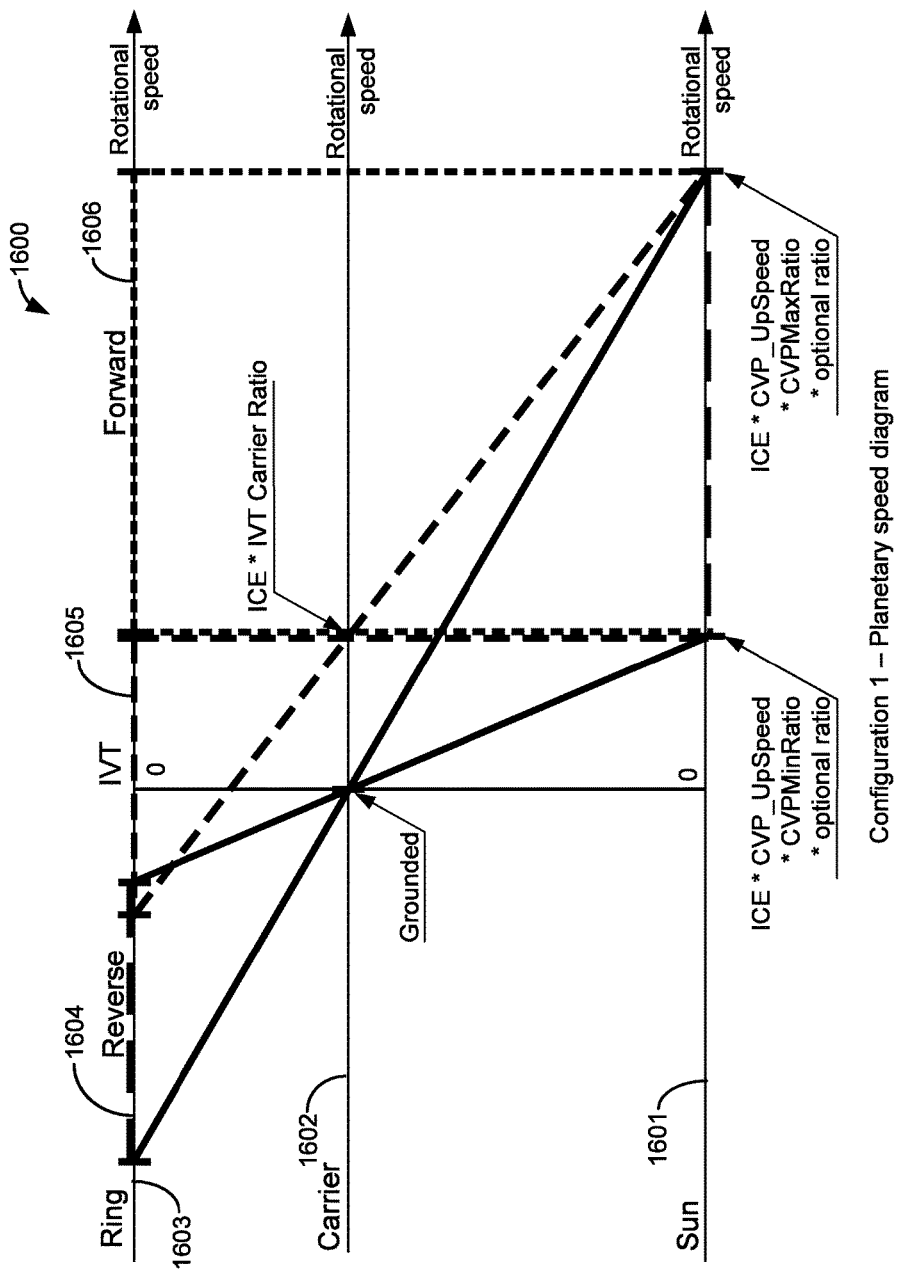
FIG. 16 is an illustrative view of the speed diagram of an exemplary transmission configuration with two direct drive modes and one powersplit mode.

Between these forward and reverse modes, the speed diagram of FIG. 16 shows a third IVT mode which allows a powered neutral feature. This IVT mode, shown on FIG. 15, is a powersplit mode in which the CVP is still connected to the sun, but the engine is also connected to the carrier of the planetary gear set through a ratio. This mode allows low speeds in positive and reverse direction, as well as a powered neutral mode.

FIG. 16 shows the speed diagram 1600 of the planetary gear set used within this configuration. The three horizontal axes represent respectively, from the bottom to the top, the sun rotation speed 1601, the carrier rotation speed 1602 and the ring rotation speed 1603.

The ring gear is always used as the output of the planetary gear set and is connected to the axle to drive the vehicle. The CVP input is always connected to the ICE 100, or other power source, through a gear ratio on its one side and to the common sun of the planetary gear set on its other side.

In the reverse mode, the clutch connecting the carrier to the ground is engaged. The planetary is then only used as a single gear ratio. All the other clutches are kept open. The maximum speed ratio of the CVP provides maximum reverse speed whereas the minimum speed ratio of the CVP provides the minimum reverse speed of this mode. The interval 1604 on the left side of the ring rotation speed axis shows the speeds achievable in this mode.

The IVT mode is activated by releasing all other clutches and engaging the clutch connecting the carrier to its corresponding ratio. Doing so, the output covers a speed varying from a reverse speed, when CVP is set at its maximum ratio to a forward speed, when the CVP is at its minimum ratio. This is a powersplit mode. The interval 1605 in the middle of the ring rotation speed axis shows the speeds achievable in this mode.

The forward mode is shown by the interval 1606 on the right side of the ring rotation speed axis on the speed diagram. Two of the planetary elements are locked together by a clutch which results in all elements of the planetary gear set running at the same speed, thus achieving a 1:1 ratio between the CVP output and the gearbox output. The interval 1606 shows the speeds achievable in this mode.

In any powersplit mode, some of the power will flow through the CVP whereas the rest will flow directly through a mechanical path. Depending on the selected mode and CVP ratio, the amount of power passing through the variator may be bigger, equal or smaller than the amount of power originating from the ICE.

The shift between the forward mode and IVT mode is synchronous. The shift between the reverse mode and IVT mode is non-synchronous and additionally, some overlap between the two modes is provided, allowing for a greater margin in operating and selecting the modes; i.e. synchronization. Overlap can be designed between the other modes by slightly adapting the gear ratios or the planetary, but this may cause them to lose their synchronous characteristic.

Figure 17:
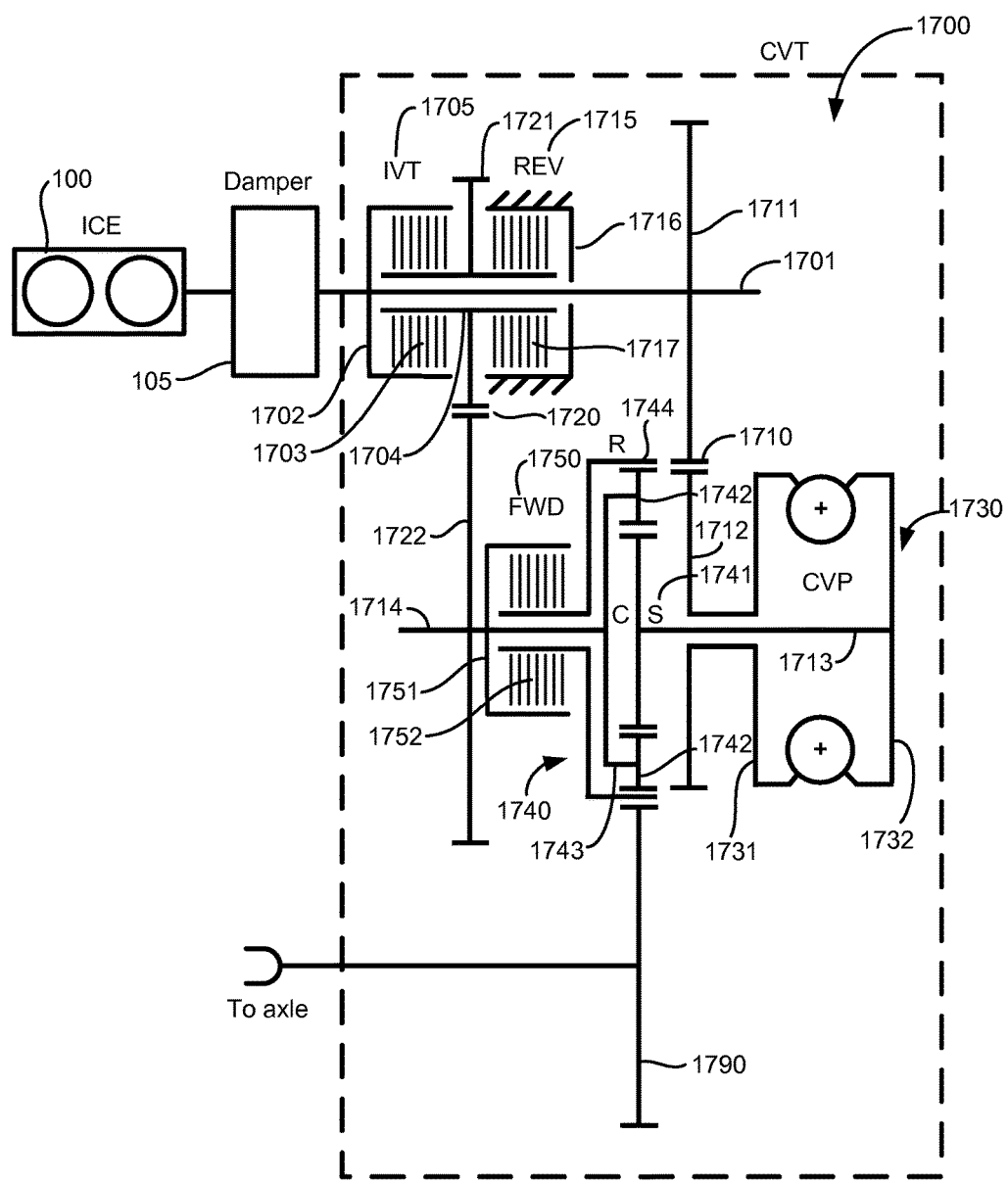
FIG. 17 is an illustrative view of a physical layout of the transmission configuration illustrated in FIG. 16 comprising two direct drive modes and one powersplit mode.

FIG. 17 shows an example of physical layout for this configuration 1700. The view is taken from the side of the vehicle. The input from the ICE 100 through the optional damper 105 is always linked to the first up-speed ratio 1710 going to the CVP 1730. The CVP output 1713 is linked to the sun gear 1741 of the planetary gear set 1740. In IVT mode, the countershaft 1714 is coupled to the carrier 1743 by engaging the clutch 1705 named IVT. The ratios between the ICE and the planetary are then the product of two gear ratios; the first one between the input 1701 and the countershaft 1714 and the second one between the countershaft 1713 on which the CVP 1730 is located and the corresponding planetary element. The FWD clutch 1750 has been drawn here to connect the ring gear 1744 and carrier 1743, although a clutch with this functionality may be located anywhere else in the planetary 1740, locking any two of the rotating elements together in order to engage the FWD mode. Finally, a REV clutch 1715 is providing the reverse mode by connecting the carrier 1743 of the planetary gear set 1740 to the ground.

Provided herein is a variable transmission 1700 based on multi-mode operation comprising: an input shaft 1701; a first portion 1702 of a first clutch 1705 drivingly engaged to the input shaft 1701; a first gear 1711 of a first gear ratio 1710 drivingly engaged about the input shaft; wherein the first gear ratio 1710 comprises the first gear 1711 drivingly engaged to a second gear 1712 wherein the second gear is engaged and centered about an offset shaft 1713; a hollow shaft 1704 centered about the input shaft 1701 comprising a second portion 1703 of the first clutch 1705 drivingly engaged to the hollow shaft 1704, a third portion 1717 of a second clutch 1715 drivingly engaged to the hollow shaft 1704 and a third gear 1721 of a second gear ratio 1720 drivingly engaged to the hollow shaft 1704; wherein the second gear ratio 1720 comprises the third gear 1721 drivingly engaged to a fourth gear 1722; a fourth portion 1716 of the second clutch 1715 centered about the input shaft 1701 and fixed to a casing; a variator (CVP) 1730 centered about the offset shaft 1713 comprising an input ring assembly 1731 drivingly engaged to the second gear 1712, and an output ring assembly 1732 drivingly engaged to the offset shaft 1713; wherein the offset shaft is drivingly engaged to a sun gear 1741 of a planetary gear set 1740; the planetary gear set comprising; the sun gear 1741, drivingly engaged to a set of planet gears 1742, a carrier 1743, and a ring gear 1744, engaged by the planet gears, wherein the ring gear 1744 is drivingly engaged to an output 1790 of a vehicle and to a fifth portion 1752 of a third clutch 1750 centered about a countershaft 1714; and wherein the carrier 1743 is connected to the fourth gear 1722 of the second gear ratio 1720, wherein the fourth gear 1722 is engaged and centered about the countershaft 1714 and is drivingly engaged a sixth portion 1751 of the third clutch 1750.

In some embodiments, the first clutch 1705 is an IVT clutch. In some embodiments, the second clutch 1715 is a reverse clutch. In some embodiments, the third clutch 1750 is a forward clutch.

In some embodiments, the third gear 1721 of the second gear ratio 1720 is connected to the transmission between the first clutch 1705 and the second clutch 1715.

In some embodiments, the variable transmission comprises three modes of operation comprising: a direct drive forward (FWD) mode; a direct drive reverse (REV) mode; and a powersplit (IVT) mode.

In some embodiments, the powersplit (IVT) mode allows a seamless ratio shift from a negative ratio, to a powered neutral ratio and a positive ratio. In some embodiments, the power from the power source is split between a high efficiency mechanical path and the CVP variator path. In some embodiments, the IVT powersplit mode is capable of providing low speeds in forward and reverse directions. In some embodiments, the IVT powersplit mode provides a powered neutral mode. In still other embodiments, when operating in a powersplit (IVT) mode, the amount of power passing through the variator (CVP) may be greater than, equal to or less than the amount of power originating from a power source depending on the CVP ratio.

In other embodiments of the variable transmission, engagement of the direct drive FWD mode comprises: activating the third clutch 1750 to lock any two elements of the planetary gearset 1740 to each other. In some embodiments, the two elements are arbitrarily chosen depending on physical constraints placed on the transmission. In some embodiments, the resulting direct drive ratio of the planetary gear set is 1:1. In other embodiments, the ratio of the transmission in FWD mode is a result of the first gear ratio and CVP ratio.

In still other embodiments of the variable transmission, engagement of the direct drive REV mode comprises: driving an incoming power source 100 through the input shaft 1701 and the CVP 1730, and activating the second clutch 1715 to ground the carrier 1743 of the planetary gearset 1740 to achieve a negative ratio. In some embodiments, the planetary gear set 1740 is only used as a reduction ratio in the direct drive REV mode.

In some embodiments of the variable transmission, the second clutch 1715 provides negative speeds and synchronization during braking and directional shifts. In some embodiments, the third clutch 1750 provides positive speeds and synchronization during braking and directional shifts.

In some embodiments of the variable transmission, the first gear ratio 1710 is an up-speed ratio. In some embodiments, the variator (CVP) 1730 is always connected directly to an up-speed ratio 1710 and to the sun gear 1741 of the planetary gear set 1740.

When operating in the powersplit (IVT) mode in some embodiments of the variable transmission, the variator (CVP) 1730 is connected directly to an up-speed ratio 1710 and to the sun gear 1741 of the planetary gear set 1740, and the carrier 1743 is connected to the ICE 100, or other power source, through a first clutch 1705 and a second gear ratio 1720.

In normal driving operation of the transmission, only one of the three clutches will be engaged. However, during transitions such as mode shift, two clutches can be partially engaged or slipping for synchronization purposes. This is also applicable for braking in order to dissipate energy in the transmission and to control the desired deceleration. Furthermore, these clutches can also be used as a torque limiter. The clutch components can be designed in a way such that in the event of excessive torques, the clutch plates can start slipping, limiting the torque on the CVP and other transmission components, protecting the variator and improving durability/life.

In some embodiments, during normal operation within one mode, only one of the first clutch 1705, the second clutch 1715 or the third clutch 1750 is active or closed at one time.

In some embodiments, both the third clutch 1750 and first clutch 1705, or both of the first clutch 1705 and second clutch 1715 can be active during transitions between modes.

In some embodiments, all three of the first clutch 1705, the second clutch 1715 and the third clutch 1750 can be active during braking.

In some embodiments, the planetary gear set 1740 is a compound planetary gearset further comprising, at least a second set of planet gears.

The second configuration, 1900, differs from the previous configuration in that it is a transmission comprising one direct drive mode and two powersplit modes. A representative, non-limiting embodiment of such a configuration is illustrated in FIGS. 18 and 19.

The FWD mode is engaged by closing the FWD clutch. Due to the fact that this connects the carrier to the ICE through another set of gears with a different ratio, the carrier is spinning at a higher speed than in IVT mode, resulting in the "Forward" speed range.

Figure 18:
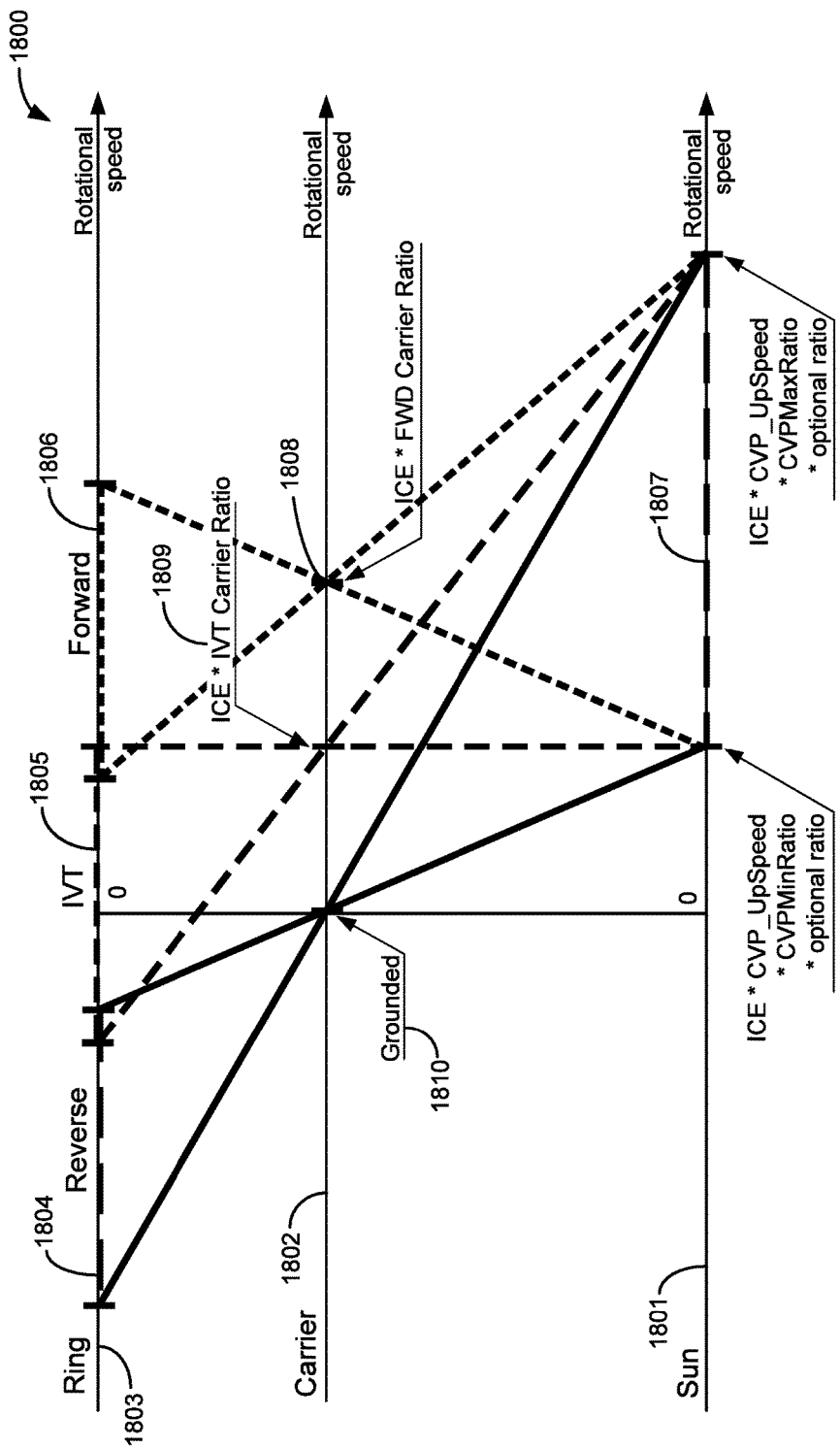
FIG. 18 is an illustrative view of the speed diagram of an exemplary transmission configuration with one direct drive mode and two powersplit modes.
Figure 19:
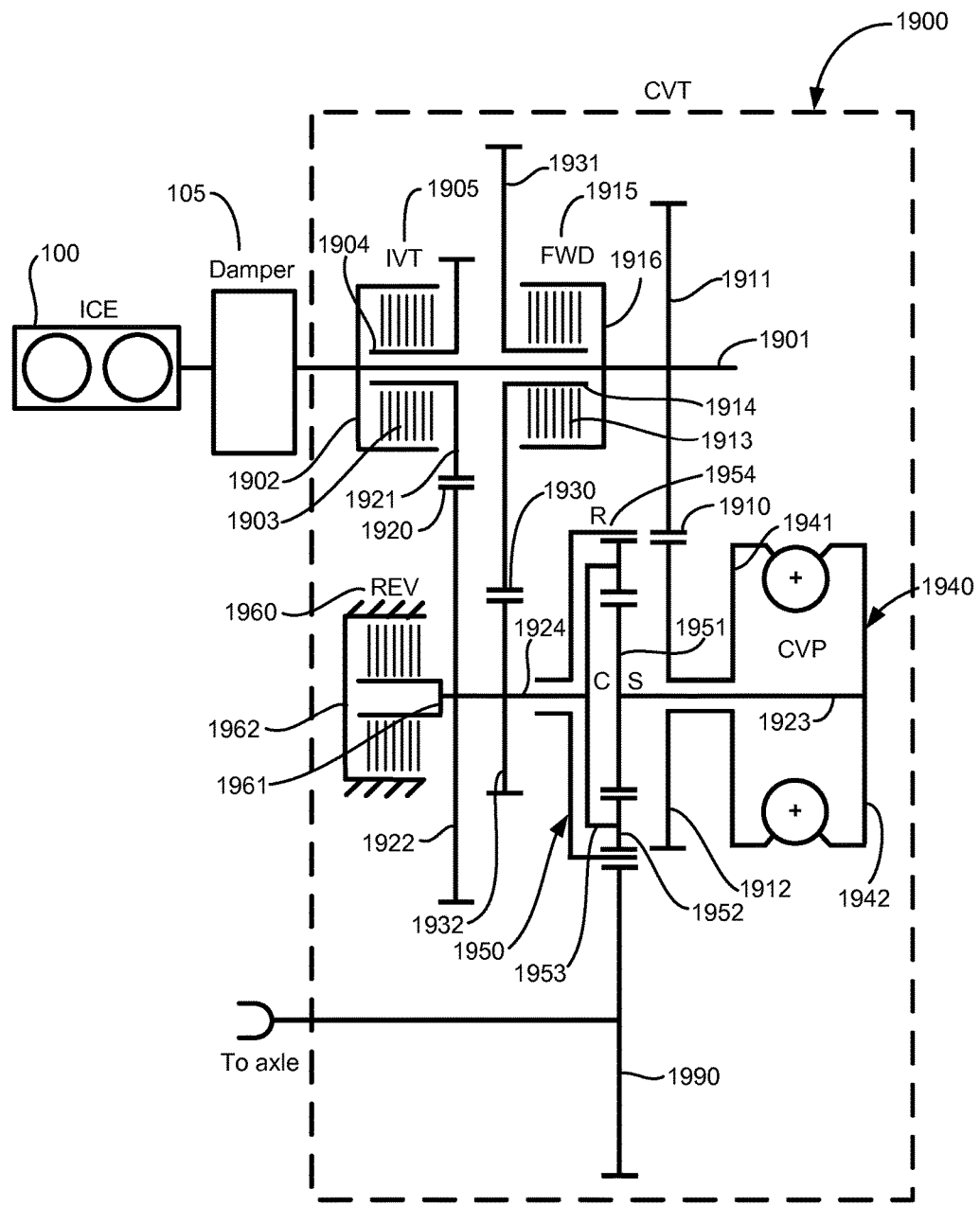
FIG. 19 is an illustrative view of a physical layout of the transmission configuration illustrated in FIG. 18 comprising one direct drive mode and two powersplit modes.

FIG. 18 shows the speed diagram 1800 of the planetary gear set used within this configuration. The three horizontal axes represent respectively, from the bottom to the top, the sun rotation speed 1801, the carrier rotation speed 1802 and the ring rotation speed 1803.

The ring gear is always used as the output of the planetary gear set and is connected to the axle to drive the vehicle. The CVP input is always connected to the ICE 100, or other power source, through a gear ratio on its one side and to the common sun of the planetary gear set on its other side.

As in the previous Configuration 1, the reverse mode is achieved by locking the carrier of the planetary gear set by closing the clutch named REV, resulting in the sun and ring of the planetary gear set to have opposite directions of rotation. The planetary is then only used as a single gear ratio. All the other clutches are kept open. The maximum speed ratio of the CVP provides maximum reverse speed whereas the minimum speed ratio of the CVP provides the minimum reverse speed of this mode. The interval 1804 on the left side of the ring rotation speed axis shows the speeds achievable in this mode.

In order to engage the IVT mode, the clutch named IVT is closed, connecting the carrier to the ICE through an appropriate gear ratio. Doing so, the output covers a speed varying from a reverse speed, when the CVP is set at its maximum ratio to a forward speed, when the CVP is at its minimum ratio. This is a powersplit mode. The interval 1805, in the middle of the ring rotation speed axis shows the speeds achievable in this mode.

The forward mode is a powersplit mode as shown by the interval on the right side of the ring rotation speed axis on the speed diagram. When the FWD clutch is closed, a path is formed between the ICE and the carrier through the appropriate gear ratio. The carrier spins at ICE*FWD carrier ratio, as indicated on the Carrier axis. As long as the ICE speed is constant, this is a fixed speed and not a range as in the case of the sun speed.

In any powersplit mode, some of the power will flow through the CVP whereas the rest will flow directly through a mechanical path. Depending on the selected mode and CVP ratio, the amount of power passing through the variator may be bigger, equal or smaller than the amount of power originating from the ICE.

The shift between the forward mode and IVT mode and the shift between the reverse mode and IVT mode is non-synchronous and additionally, some overlap between the modes is provided, allowing for a greater margin in operating and selecting the modes; i.e. synchronization. Additional overlap can be designed by slightly adapting the gear ratios or the planetary.

The first power path is always through the CVP to the sun of the PGS. Since the CVP has a variable speed ratio, the sun gear has a variable speed, shown as a dotted line 1807 on the sun axis 1801 of the speed diagram 1800.

The second power path, of three, is formed between the ICE and the carrier of the PGS by engaging one of the IVT or FWD clutches. If the FWD clutch is closed, a path is formed between the ICE and the carrier through the appropriate gear ratio; and the carrier spins at ICE*FWD carrier ratio, as indicated on the carrier axis at 1808. As long as the ICE speed is constant, this is a fixed speed, and not a range as in the case of the sun speed. This is the same for the IVT mode; wherein the IVT clutch is closed, forming a path between the ICE and the carrier, with a different gear ratio. The carrier now spins at ICE*IVT carrier ratio, as indicated on the carrier axis at 1809.

Finally, the REV is accomplished by closing the REV clutch and grounding the carrier, as indicated on the carrier axis at 1810.

As illustrated in FIG. 19, provided herein is a variable transmission 1900 based on multi-mode operation comprising: an input shaft 1901; a first portion 1902 of a first clutch 1905 drivingly engaged to the input shaft 1901; a third portion 1916 of a second clutch 1915 drivingly engaged to the input shaft 1901; a first gear 1911 of a first gear ratio 1910 drivingly engaged about the input shaft 1901; wherein the first gear ratio 1910 comprises the first gear 1911 drivingly engaged to a second gear 1912 and the second gear centered about an offset shaft 1923; a first hollow shaft 1904 centered about the input shaft 1901 drivingly engaged to a second portion 1903 of the first clutch 1905 and to a third gear 1921; a second hollow shaft 1914 centered about the input shaft 1901 drivingly engaged to a fourth portion 1913 of the second clutch 1915 and to a fifth gear 1931; a variator (CVP) 1940 centered about the offset shaft 1923 comprising an input ring assembly 1941 drivingly engaged to the second gear 1912, and an output ring assembly 1942 drivingly engaged to the offset shaft 1923; wherein the offset shaft 1923 is drivingly engaged to a sun gear 1951 of a planetary gear set 1950; the planetary gear set 1950 comprising; the sun gear 1951, drivingly engaged to a set of planet gears 1952, a carrier 1953, and a ring gear 1954, drivingly engaged by the planet gears; wherein the ring gear 1954 is drivingly engaged to an output 1990 of a vehicle; and wherein the carrier 1953 is drivingly engaged on a countershaft 1924 to a sixth gear 1932, to a fourth gear 1922 and to a fifth portion 1961 of a third clutch 1960; wherein a second gear ratio 1920 comprises the fourth gear 1922 drivingly engaged to the third gear 1921; wherein a third gear ratio 1930 comprises the sixth gear 1932 drivingly engaged to the fifth gear 1931; wherein a sixth portion 1962 of the third clutch 1960 is fixed to the casing.

In some embodiments, the first clutch 1905 is an IVT clutch. In some embodiments, the second clutch 1915 is a forward clutch. In some embodiments, the third clutch 1960 is a reverse clutch.

In some embodiments of the variable transmission, the second gear ratio 1920 and the third gear ratio 1930 are connected to the transmission between the first clutch 1905 and the second clutch 1915.

In some embodiments, the variable transmission comprises three modes of operation comprising: a powersplit forward (FWD) mode; a direct drive reverse (REV) mode; and a powersplit (IVT) mode.

In some embodiments, the powersplit (IVT) mode provides a seamless ratio shift from a negative ratio, to a powered neutral ratio and a positive ratio. In some embodiments, power from a power source is split between a high efficiency mechanical path and a CVP variator path.

In some embodiments, the powersplit IVT mode is capable of providing low speeds in forward and reverse directions. In some embodiments, the powersplit IVT mode provides a powered neutral mode.

In some embodiments of the variable transmission, engagement of the FWD mode comprises: activating the second clutch 1915 to connect the input shaft 1901 through the third gear ratio 1930 to the carrier 1953.

In some embodiments of the variable transmission, engagement of the direct drive REV mode comprises: driving an incoming power source 100 through the input shaft 1901 and the CVP 1940, and activating the third clutch 1960 to ground the carrier 1953 of the planetary gear set 1950 to achieve a negative ratio.

In some embodiments of the variable transmission, the planetary gear set 1950 is only used as a reduction ratio in the direct drive REV mode. In some embodiments, the third clutch 1960 provides negative speeds and synchronization during braking and directional shifts.

In some embodiments, the second clutch 1915 provides positive speeds and synchronization during braking and directional shifts.

In some embodiments, the first gear ratio 1910 is an up-speed ratio. In some embodiments, the variator (CVP) 1940 is always connected directly to an up-speed ratio 1910 and to the sun gear 1951 of the planetary gear set 1950.

In some embodiments of the variable transmission, when operating in the powersplit (IVT) mode, the variator (CVP) 1940 is connected directly to an up-speed ratio 1910 and to the sun gear 1951 of the planetary gear set 1950, and the carrier 1953 is connected to the ICE 100 through a first clutch 1905 and a second gear ratio 1920.

In some embodiments of the variable transmission, during normal operation within one mode, only one of the first clutch 1905, the second clutch 1915 or the third clutch 1960 is active or closed at one time. In other embodiments, both the third clutch 1960 and first clutch 1905 or both of the first clutch 1905 and second clutch 1915 can be active during transitions between modes. In still other embodiments, all three of the first clutch 1905, the second clutch 1915 and the third clutch 1960 can be active during braking.

In some embodiments of the variable transmission, the planetary gear set 1950 is a compound planetary gearset further comprising at least a second set of planet gears.

In some embodiments of the variable transmission, when operating in a powersplit (IVT) mode, the amount of power passing through the variator (CVP) may be greater than, equal to or less than the amount of power originating from a power source depending on the CVP ratio.

Figure 20:
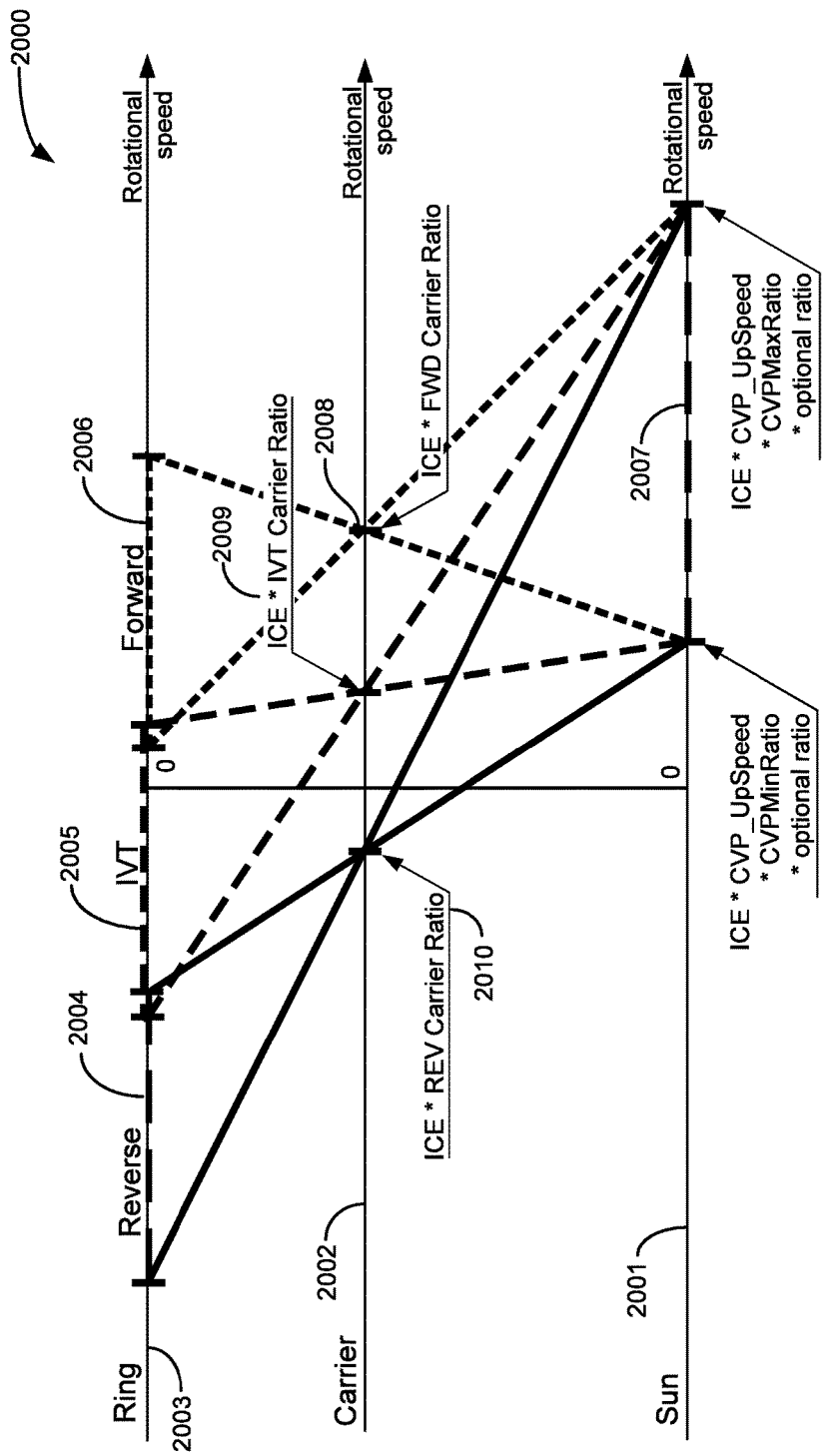
FIG. 20 is an illustrative view of the speed diagram of an exemplary transmission configuration with three powersplit modes.
Figure 21:
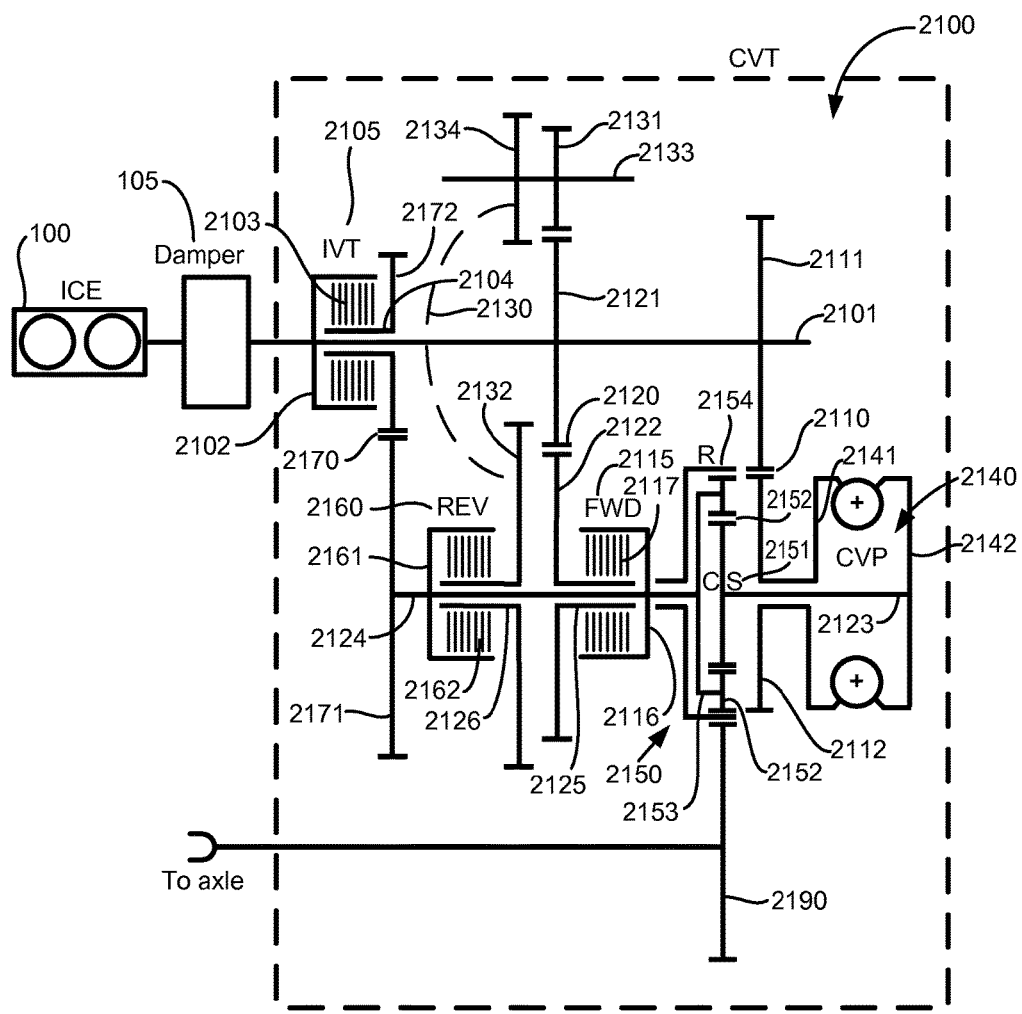
FIG. 21 is an illustrative view of a physical layout of the transmission configuration illustrated in FIG. 20 comprising three powersplit modes.

The third configuration, as illustrated in FIGS. 20 and 21 has three powersplit modes, meaning that all three modes will have two powerpaths between the ICE and the planetary gear set (PGS), as opposed to a direct mode, where all the power flows through the CVP path to the PGS. It should be noted that this description assumes a constant power source (ICE) speed, however, in reality, the power source, or ICE speed may be varied, but this has no effects on the workings of the gearbox as explained below.

By engaging the appropriate clutches, the carrier is rotating at different speeds in all three modes, resulting in different output speed ranges. The IVT and forward modes are achieved in the same way as described in Configuration 2. Reverse functionality is achieved by an additional idler shaft, providing a power path wherein the input shaft and the carrier are rotating in the same direction, as opposed to the other modes. Different speed ranges can be achieved by selecting different gear ratios.

FIG. 20 shows the speed diagram 2000 of the planetary gear set used within this configuration. The three horizontal axes represent respectively, from the bottom to the top, the sun rotation speed 2001, the carrier rotation speed 2002 and the ring rotation speed 2003.

The ring gear is always used as the output of the planetary gear set and is connected to the axle to drive the vehicle. The CVP input is always connected to the ICE 100, or other power source, through a gear ratio on its one side and to the common sun of the planetary gear set on its other side.

The reverse mode is accomplished here by adding an idler shaft and by closing the clutch named REV, resulting in the carrier turning in a reverse direction rotation. All the other clutches are kept open. This is a powersplit mode. The interval 2004 on the left side of the ring rotation speed axis shows the speeds achievable in this mode.

In order to engage the IVT mode, the clutch named IVT is closed, connecting the carrier to the ICE through an appropriate gear ratio. Doing so, the output covers a speed varying from a reverse speed, when CVP is set at its maximum ratio to a forward speed, when the CVP is at its minimum ratio. This is a powersplit mode. The interval 2005, in the middle of the ring rotation speed axis shows the speeds achievable in this mode.

The forward mode is a powersplit mode as shown by the interval on the right side of the ring rotation speed axis on the speed diagram. When the FWD clutch is closed, a path is formed between the ICE and the carrier through the appropriate gear ratio. The carrier spins at ICE*FWD carrier ratio, as indicated on the Carrier axis. The interval 2006, on the right side of the ring rotation speed axis shows the speeds achievable in this mode.

In any powersplit mode, some of the power will flow through the CVP whereas the rest will flow directly through a mechanical path. Depending on the selected mode and CVP ratio, the amount of power passing through the variator may be bigger, equal or smaller than the amount of power originating from the ICE.

The first power path is always through the CVP to the sun of the PGS. Since the CVP has a variable speed ratio, the sun has a variable speed, shown as a dotted line 2007 on the sun axis 2001 of the speed diagram 2000.

The second power path, of which there are three, is formed between the ICE and the carrier of the PGS by engaging one of the three clutches. If the FWD clutch is closed, a path is formed between the ICE and the carrier through the appropriate gear ratio; and the carrier spins at ICE*FWD carrier ratio, as indicated on the carrier axis at 2008. As long as the ICE speed is constant, this is a fixed speed, and not a range as in the case of the sun speed. This is the same for the IVT mode; wherein the IVT clutch is closed, forming a path between the ICE and the carrier, with a different gear ratio. The carrier now spins at ICE*IVT carrier ratio, as indicated on the carrier axis at 2009.

Finally, in the REV mode a third power path is formed. In this case the path is a bit more complex, where it is desired to have the carrier spin at a negative speed, which is accomplished here by adding an idler shaft. However, it is still a mechanical path between the ICE and the carrier, spinning the carrier at ICE*REV carrier ratio, as indicated on the carrier axis at 2010.

As illustrated in FIG. 21, provided herein is a variable transmission 2100 based on multi-mode operation comprising: an input shaft 2101; a first portion 2102 of a first clutch 2105 drivingly engaged to the input shaft 2101; a first gear 2111 of a first gear ratio 2110 drivingly engaged about the input shaft 2101; a third gear 2121 of a second gear ratio 2120 drivingly engaged about the input shaft 2101; wherein the first gear ratio 2110 comprises the first gear 2111 drivingly engaged to a second gear 2112 and the second gear centered about an offset shaft 2123; a variator (CVP) 2140 centered about the offset shaft 2123, comprising an input ring assembly 2141 drivingly engaged to the second gear 2112, and an output ring assembly 2142 drivingly engaged to the offset shaft 2123; wherein the offset shaft 2123 is drivingly engaged to a sun gear 2151 of a planetary gear set 2150; the planetary gear set 2150 comprising; the sun gear 2151, drivingly engaged to a set of planet gears 2152, a carrier 2153, and a ring gear 2154, drivingly engaged by the planet gears, wherein the ring gear 2154 is drivingly engaged to an output of a vehicle 2190; and wherein the carrier 2153 is drivingly engaged on a countershaft 2124 to a third portion 2116 of a second clutch 2115, to a fifth portion 2161 of a third clutch 2160 and to an eighth gear 2171 of a fourth gear ratio 2170; a first hollow shaft 2125 centered about the countershaft 2124, drivingly engaged to a fourth portion 2117 of the second clutch 2115 and to a fourth gear 2122 of the second gear ratio 2120; a second hollow shaft 2126 centered about the countershaft 2124, drivingly engaged to a sixth portion 2162 of the third clutch 2160 and to a sixth gear 2132 of a third gear ratio 2130; and a third hollow shaft 2104 centered about the input shaft 2101, drivingly engaged to a second portion 2103 of the first clutch 2105 and to a ninth gear 2172 of the fourth gear ratio 2170; an idler shaft 2133, drivingly engaged to a fifth gear 2131 of the second gear ratio 2120 and to a seventh gear 2134 of the third gear ratio 2130; wherein the second gear ratio 2120 comprises the third gear 2121, the fourth gear 2122 and the fifth gear 2131; and wherein the third gear 2121 is drivingly engaged to the fourth gear 2122 and to the fifth gear 2131; wherein the third gear ratio 2130 comprises the sixth gear 2132 and the seventh gear 2134; and the sixth gear 2132 is drivingly engaged to the seventh gear 2134; and wherein the fourth gear ratio 2170 comprises the eighth gear 2171 and the ninth gear 2172; and the eighth gear 2171 is drivingly engaged to the ninth gear 2172.

In some embodiments, the first clutch 2105 is an IVT clutch. In some embodiments, the second clutch 2115 is a forward clutch. In some embodiments, the third clutch 2160 is a reverse clutch. In some embodiments, the first gear ratio 2110, the second gear ratio 2120 and the fourth gear ratio 2170 are connected to the input shaft after IVT clutch.

In some embodiments, the variable transmission comprises three modes of operation comprising: a powersplit forward (FWD) mode; a powersplit reverse (REV) mode; and a powersplit (IVT) mode.

In some embodiments, the powersplit (IVT) mode allows a seamless ratio shift from a negative ratio, to a powered neutral ratio and a positive ratio. In some embodiments, power from the power source is split between a high efficiency mechanical path and the CVP variator path. In some embodiments, the IVT mode provides a powered neutral mode.

In some embodiments of the variable transmission, engagement of the powersplit FWD mode comprises: activating the second clutch 2115 to connect the carrier 2153 to the ICE 100 through the second gear ratio 2120.

In some embodiments of the variable transmission, engagement of the powersplit REV mode comprises: activating the third clutch 2160 to connect the carrier 2153 to the ICE 100 through the second and third gear ratios 2120 and 2130 respectively.

In some embodiments, the third clutch 2160 provides negative speeds, and synchronization during braking and directional shifts. In some embodiments, the second clutch 2115 provides positive speeds, and synchronization during braking and directional shifts.

In some embodiments of the variable transmission, when operating in the powersplit (IVT) mode, the variator (CVP) 2140 is connected directly to an up-speed ratio 2110 and to the sun gear 2151 of the planetary gear set 2150, and the carrier 2153 is connected to the ICE 100 through a first clutch 2105 and the fourth gear ratio 2170. In some embodiments, during normal operation within one mode, only one of the first clutch 2105, the second clutch 2115 or the third clutch 2160 is active or closed at one time. In other embodiments, both the third clutch 2160 and the first clutch 2105, or both of the first clutch 2105 and second clutch 2115 can be active during transitions between modes. In still other embodiments of the variable transmission, all three of the first clutch 2105, the second clutch 2115 and the third clutch 2160 can be active during braking.

In some embodiments of the variable transmission, the planetary gear set 2150 is a compound planetary gearset further comprising, at least a second set of planet gears.

In some embodiments, the variable transmissions described herein further comprise a torsional damper 105, wherein said torsional damper is located between an input power source 100 and the input shaft to avoid or reduce transferring torque peaks and vibrations from the input power source to one or more of the input shaft, the first clutch, the second clutch, the third clutch, the variator, any of the gear ratios and the planetary gear set. In some embodiments, the torsional damper is coupled with a clutch.

Provided herein are various embodiments of variable transmissions comprising fraction fluid lubricant.

In some embodiments of the variable transmissions described herein an input power source comprises an internal combustion engine (ICE).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A variable transmission based on a three mode gearbox with directional stage comprising:
   an input shaft;
   a variator (CVP) comprising an input ring assembly drivingly engaged to the input shaft, and an output ring assembly;
   a dual planetary gear set comprising;
      a direct (DIR) drive clutch,
      a first planetary gearset comprising the elements: a first sun gear, a first set of planet gears, a first carrier, and a first ring gear, and
      a second planetary gearset comprising the elements: a second sun gear, a second set of planet gears, a second carrier and a second ring gear,
      wherein the variator (CVP) is connected to the first sun, and
      wherein the variator (CVP) may also be connected to an optional first gear ratio;
   an infinitely variable transmission (IVT) clutch and an overdrive (OD) clutch linked to the input shaft between a power source (ICE) and the variator; wherein the ICE is connected through the output of the OD clutch to the second carrier through a second gear ratio; and
   wherein the output of the IVT clutch is connected to the second ring through a third gear ratio which is linked to the first carrier;
   the first sun gear and the second sun gear are connected to form a dual sun gear set;
   the second ring and the first carrier are connected;
   the first ring gear (output) is drivingly engaged to a first part of a forward (FWD) clutch and to a reverse idler shaft (REV-IS) wherein, the reverse idler shaft (REV-IS) is connected to an output of the variable transmission through a reverse (REV) clutch.

2. The variable transmission of claim 1, wherein the optional first gear ratio is connected to the transmission before the variator (CVP), or between the variator (CVP) and the first sun gear, or not included in the transmission.

3. The variable transmission of claim 1, comprising three modes of operation comprising:
   a power recirculation (IVT) mode;
   a direct drive mode; and
   a powersplit (OD) mode.

4. The variable transmission of claim 3, wherein the power recirculation (IVT) mode allows a seamless ratio shift from a negative ratio to a powered neutral ratio and positive ratios.

5. The variable transmission of claim 4, wherein power from the power source is split between a high efficiency mechanical path and the CVP variator path.

6. The variable transmission of claim 4, wherein power-recirculation is present in order to provide speed ratios close to or equal to zero.

7. The variable transmission of claim 3, wherein the direct drive mode comprises the direct (DIR) drive clutch configured to lock any two elements of the first planetary gearset to each other.

8. The variable transmission of claim 7, wherein the any two elements are arbitrarily chosen depending on physical constraints placed on the transmission.

9. The variable transmission of claim 3, wherein the powersplit (OD) mode provides high speeds and increases the spread of the transmission.

10. The variable transmission of claim 9, wherein power from the power source is split between a high efficiency mechanical path and the CVP variator path.

11. The variable transmission of claim 1, wherein the REV clutch provides negative speeds, and synchronization during braking and directional shifts.

12. The variable transmission of claim 1, wherein the FWD clutch provides positive speeds, and synchronization during braking and directional shifts.

13. The variable transmission of claim 1, wherein the variator (CVP) is always connected directly to the power source (ICE) and to the dual sun gear set.

14. The variable transmission of claim 3, wherein when operating in the power recirculation (IVT) mode, the second ring gear is connected to the ICE through a gear ratio and turns at a constant speed.

15. The variable transmission of claim 3, wherein when operating in the direct drive mode, the dual planetary gearset is locked in a 1:1 ratio and all power flows through the CVP.

16. The variable transmission of claim 3, wherein when operating in the powersplit (OD) mode, the second carrier is connected to the ICE through a gear ratio and turns at a constant speed.

17. The variable transmission of claim 1, wherein the three mode gearbox consists of the variator (CVP) and the dual planetary gearset.

18. The variable transmission of claim 1, wherein during normal operation within one mode, only one of the IVT clutch, DIR clutch or OD clutch and one of the FWD clutch or REV clutches is active or closed at one time.

19. The variable transmission of claim 1, wherein both the IVT clutch and OD clutch or both of the IVT and DIR clutch or both of the DIR and OD clutch, and both of the FWD clutch and REV clutch can be active during transitions between modes or during braking.

* * * * *